(12) United States Patent
Hong et al.

(10) Patent No.: US 12,517,357 B2
(45) Date of Patent: Jan. 6, 2026

(54) OPTICAL SYSTEM AND HEAD-MOUNTED DEVICE

(71) Applicant: LARGAN PRECISION CO., LTD., Taichung (TW)

(72) Inventors: Yu Jie Hong, Taichung (TW); Fuh-Shyang Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 703 days.

(21) Appl. No.: 17/856,865

(22) Filed: Jul. 1, 2022

(65) Prior Publication Data
US 2023/0384594 A1    Nov. 30, 2023

(30) Foreign Application Priority Data
May 27, 2022   (TW) .................................. 111119825

(51) Int. Cl.
*G02B 27/01* (2006.01)
*G02B 13/00* (2006.01)
*G02F 1/1335* (2006.01)

(52) U.S. Cl.
CPC ..... *G02B 27/0172* (2013.01); *G02B 13/0035* (2013.01); *G02F 1/133536* (2013.01)

(58) Field of Classification Search
CPC ... G02B 27/0172; G02B 13/0035; G02B 9/12
See application file for complete search history.

(56) References Cited

U.S. PATENT DOCUMENTS

| 3,443,858 A | 5/1969 | Russa |
| 9,555,589 B1 | 1/2017 | Ambur et al. |

(Continued)

FOREIGN PATENT DOCUMENTS

| CN | 102812284 B | 7/2016 |
| CN | 105934134 B | 12/2019 |

(Continued)

OTHER PUBLICATIONS

Taiwan Office Action dated Sep. 4, 2023 in application No. 111119825.

(Continued)

*Primary Examiner* — George G. King
*Assistant Examiner* — Natasha Nigam
(74) *Attorney, Agent, or Firm* — Maschoff Brennan

(57) ABSTRACT

An optical system includes an aperture stop, an image surface, a reflective polarizer, a partial reflector, first and second quarter-wave plates and first, second and third lens elements. The aperture stop and the image surface are respectively at a front side and a rear side of the optical system. The reflective polarizer is between the aperture stop and the image surface. The partial reflector is between the reflective polarizer and the image surface. The first quarter-wave plate is between the reflective polarizer and the partial reflector. The second quarter-wave plate is between the partial reflector and the image surface. The first lens element is between the aperture stop and the image surface. The second lens element is between the first lens element and the image surface. The third lens element has negative refractive power and is between the second lens element and the image surface.

31 Claims, 11 Drawing Sheets

(56) References Cited

U.S. PATENT DOCUMENTS

| | | | |
|---|---|---|---|
| 9,557,568 B1 | 1/2017 | Ouderkirk et al. |
| 9,581,744 B1 | 2/2017 | Yun et al. |
| 9,581,827 B1 | 2/2017 | Wong et al. |
| 9,599,761 B1 | 3/2017 | Ambur et al. |
| 9,715,114 B2 | 7/2017 | Yun et al. |
| 9,829,616 B2 | 11/2017 | Yun et al. |
| 9,835,777 B2 | 12/2017 | Ouderkirk et al. |
| 9,945,998 B2 | 4/2018 | Ouderkirk et al. |
| 9,945,999 B2 | 4/2018 | Wong et al. |
| 9,952,371 B2 | 4/2018 | Ambur et al. |
| 9,995,939 B2 | 6/2018 | Yun et al. |
| 10,007,035 B2 | 6/2018 | Ouderkirk et al. |
| 10,007,043 B2 | 6/2018 | Ambur et al. |
| 10,078,164 B2 | 9/2018 | Yun et al. |
| 10,185,148 B2 | 1/2019 | Li et al. |
| 10,203,489 B2 | 2/2019 | Khan et al. |
| 10,302,950 B2 | 5/2019 | Ouderkirk et al. |
| 10,324,292 B2 | 6/2019 | Li et al. |
| 10,330,930 B2 | 6/2019 | Wong et al. |
| 10,338,380 B2 | 7/2019 | Yun et al. |
| 10,338,393 B2 | 7/2019 | Yun et al. |
| 10,394,040 B2 | 8/2019 | Gollier et al. |
| 10,444,496 B2 | 10/2019 | Ambur et al. |
| 10,564,427 B2 | 2/2020 | Ouderkirk et al. |
| 10,663,727 B2 | 5/2020 | Ouderkirk et al. |
| 10,670,867 B2 | 6/2020 | Yun et al. |
| 10,678,052 B2 | 6/2020 | Ouderkirk et al. |
| 10,747,002 B2 | 8/2020 | Yun et al. |
| 10,747,003 B2 | 8/2020 | Ouderkirk et al. |
| 10,754,159 B2 | 8/2020 | Ouderkirk et al. |
| 10,838,208 B2 | 11/2020 | Ouderkirk et al. |
| 10,921,594 B2 | 2/2021 | Ambur et al. |
| 11,156,814 B2 | 10/2021 | Steiner et al. |
| 11,662,551 B2 | 5/2023 | Wang et al. |
| 2010/0177113 A1* | 7/2010 | Gay .................. G02B 30/27 359/484.04 |
| 2016/0116745 A1* | 4/2016 | Osterhout ............. G02B 7/008 359/614 |
| 2016/0255748 A1* | 9/2016 | Kim .................. G02B 27/0006 361/695 |
| 2019/0265465 A1 | 8/2019 | Wong et al. |
| 2019/0265466 A1 | 8/2019 | Yun et al. |
| 2019/0377182 A1* | 12/2019 | Sharp .................. G02B 5/3083 |
| 2020/0096780 A1 | 3/2020 | Ouderkirk et al. |
| 2020/0124856 A1 | 4/2020 | Ouderkirk et al. |
| 2020/0192089 A1 | 6/2020 | Haddick et al. |
| 2020/0241305 A1 | 7/2020 | Ouderkirk et al. |
| 2020/0348527 A1 | 11/2020 | Jamali et al. |
| 2021/0003901 A1 | 1/2021 | Yaroshchuk et al. |
| 2021/0349285 A1* | 11/2021 | Chang ................... H04N 23/58 |
| 2022/0082731 A1* | 3/2022 | Mun .................... G02B 1/002 |
| 2022/0373806 A1* | 11/2022 | Stroud ............... G02B 27/0176 |
| 2023/0143390 A1 | 5/2023 | Chen et al. |

FOREIGN PATENT DOCUMENTS

| | | | |
|---|---|---|---|
| CN | 112433343 A | * | 3/2021 |
| CN | 112596238 A | | 4/2021 |
| TW | 201728984 A | | 8/2017 |
| TW | 202045982 A | | 12/2020 |
| TW | M615839 U | * | 8/2021 |
| TW | M623420 U | | 2/2022 |
| TW | M632322 U | | 9/2022 |

OTHER PUBLICATIONS

IN Examination Report dated Aug. 27, 2025 in application No. 202334031636.

* cited by examiner

OPTICAL SYSTEM AND HEAD-MOUNTED DEVICE

RELATED APPLICATIONS

This application claims priority to Taiwan Application 111119825, filed on May 27, 2022, which is incorporated by reference herein in its entirety.

BACKGROUND

Technical Field

The present disclosure relates to an optical system and a head-mounted device, more particularly to an optical system applicable to a head-mounted device.

Description of Related Art

With the advancement of semiconductor manufacturing technology, electronic components have been miniaturized and the performance of miniature electronic components has been improved, and image sensors for having more pixels has been scaled down. Therefore, featuring high image quality becomes one of the indispensable features of a miniature optical system nowadays. Furthermore, due to the popularization of high-performance microprocessors and microdisplays, the technology related to smart head-mounted devices rapidly develops in recent years. With the rise of artificial intelligence, electronic devices equipped with optical systems are trending towards multi-functionality for various applications, and the functional requirements for computer vision have been increasing.

The head-mounted devices have become smaller and more lightweight, and also have various intelligent applications such as virtual reality (VR), augmented reality (AR) and mixed reality (MR) in the rapidly developing technology landscape. VR has been widely applied in medical health areas and engineering, real estate, education, video game and entertainment industries. However, the head-mounted devices are still in the developing stage, and there are still many areas that need to be improved, such as the weight and size of the head-mounted devices and the quality of images. In the early stages, the VR head-mounted devices usually use conventional optical lenses or Fresnel lenses. Conventional optical lenses may provide good image quality, but it is hard to effectively reduce the device size. On the other hand, the use of Fresnel lenses may reduce the device size, but the image quality may be poor. Therefore, researchers and developers are looking for lens combinations that are small in size and provide high image quality.

SUMMARY

According to one aspect of the present disclosure, an optical system includes an aperture stop, an image surface, a reflective polarizer, a partial reflector, a first quarter-wave plate, a second quarter-wave plate, a first optical lens element, a second optical lens element and a third optical lens element. The aperture stop is located at a front side of the optical system. The image surface is located at a rear side of the optical system. The reflective polarizer is located between the aperture stop and the image surface. The partial reflector is located between the reflective polarizer and the image surface. The first quarter-wave plate is located between the reflective polarizer and the partial reflector. The second quarter-wave plate is located between the partial reflector and the image surface. The first optical lens element is located between the aperture stop and the image surface. The second optical lens element is located between the first optical lens element and the image surface. The third optical lens element is located between the second optical lens element and the image surface. In addition, the third optical lens element has negative refractive power.

According to another aspect of the present disclosure, a head-mounted device includes a display unit, a digital signal processor, an inertial measurement unit, a support structure and an optical system. The digital signal processor is in signal communication with the display unit. The inertial measurement unit is in signal communication with the digital signal processor. The optical system is located on one side of the display unit, and the optical system includes an aperture stop, an image surface, a reflective polarizer, a partial reflector, a first quarter-wave plate, a second quarter-wave plate, a first optical lens element, a second optical lens element and a third optical lens element. The aperture stop is located at a front side of the optical system. The image surface is located at a rear side of the optical system, and the image surface is located at the display unit. The reflective polarizer is located between the aperture stop and the image surface. The partial reflector is located between the reflective polarizer and the image surface. The first quarter-wave plate is located between the reflective polarizer and the partial reflector. The second quarter-wave plate is located between the partial reflector and the image surface. The first optical lens element is located between the aperture stop and the image surface. The second optical lens element is located between the first optical lens element and the image surface. The third optical lens element is located between the second optical lens element and the image surface. In addition, the third optical lens element has negative refractive power.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
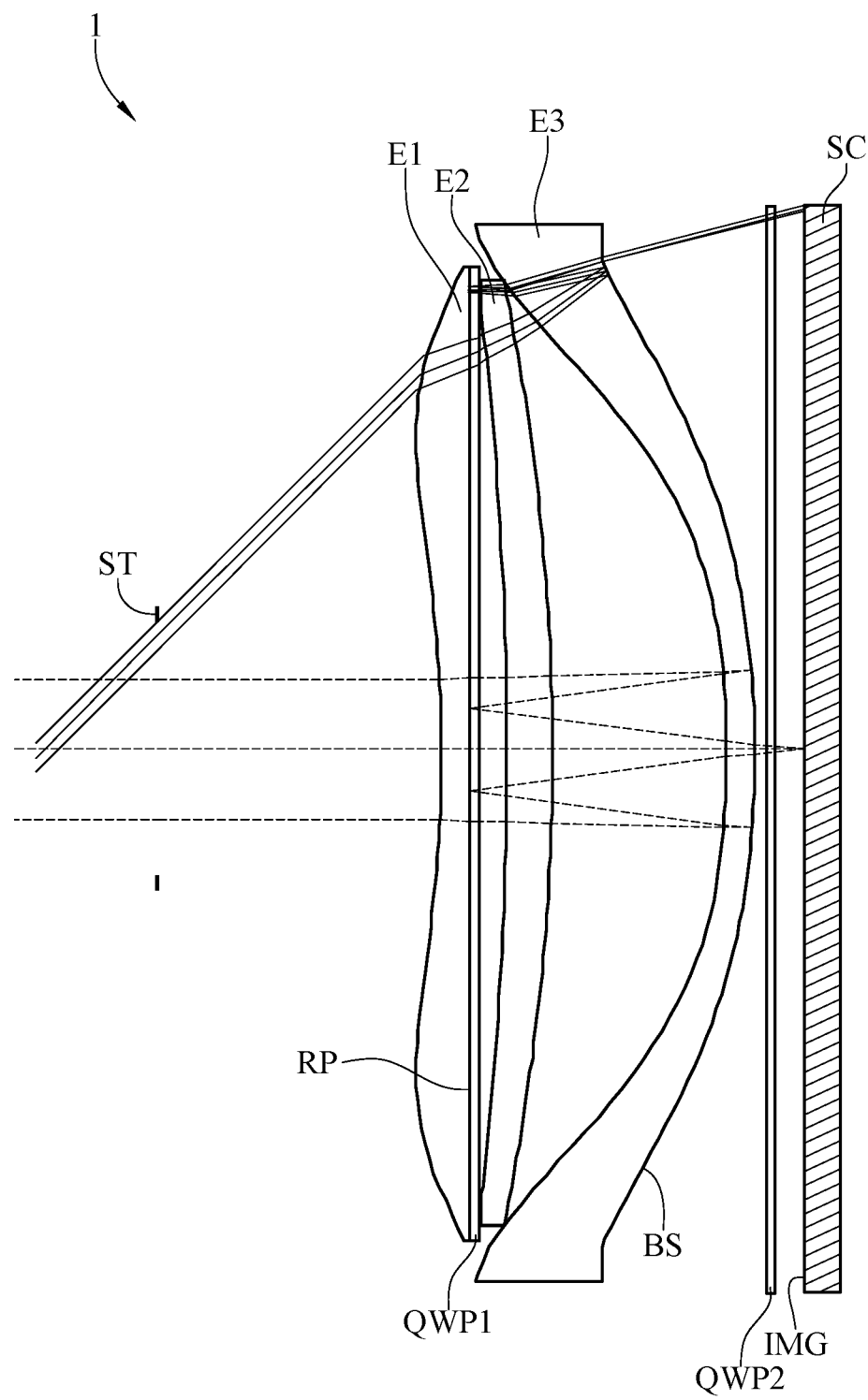
FIG. 1 is a schematic view of an optical system and a display unit according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical system. The optical system includes an aperture stop, an image surface, a reflective polarizer, a partial reflector, a first quarter-wave plate, a second quarter-wave plate, a first optical lens element, a second optical lens element and a third optical lens element. In addition, the aperture stop is located at a front side of the optical system, and the image surface is located at a rear side of the optical system. Said front side of the optical system refers to one side of the optical system located relatively close to, for example, a viewer's eye, and said rear side of the optical system refers to one side of the optical system located relatively close to a display unit which displays images. In addition, the image surface can be located at the display unit, and the aperture stop can be located at a position where the viewer's eye is located.

The reflective polarizer is located between the aperture stop and the image surface. The partial reflector is located between the reflective polarizer and the image surface. The first quarter-wave plate is located between the reflective polarizer and the partial reflector. The second quarter-wave plate is located between the partial reflector and the image surface. The first optical lens element is located between the aperture stop and the image surface. The second optical lens element is located between the first optical lens element and the image surface. The third optical lens element is located between the second optical lens element and the image surface. In addition, the third optical lens element has negative refractive power. Therefore, it is favorable for improving the image quality. Moreover, there can be an air gap in a paraxial region between the first optical lens element and the second optical lens element. Moreover, there can be an air gap in a paraxial region between the second optical lens element and the third optical lens element. Moreover, the partial reflector can have an average light reflectivity of, for example, at least 35%. Said average light reflectivity may refer to an average value of light reflectivities of the partial reflector for various wavelengths of light.

According to the present disclosure, by the arrangement of the wave plates, the reflective polarizer, the partial reflector and the lens elements, the polarization state of light travelling in the optical system can be converted, and the light can be reflected and refracted by the components of the optical system, so that the total track length of the optical system can be reduced and stray light can be eliminated, thereby reducing the size and weight of a head-mounted device having the optical system. Please refer to FIG. 12, which shows the track of light travelling in the optical system. At first, light is incident from the display unit SC in a vertical polarization state, then the light passes through the second quarter-wave plate QWP2 and is converted into a circular polarization state, and then, the light in the circular polarization state passes through the first quarter-wave plate QWP1 and is converted into a horizontal polarization state. The reflective polarizer RP only allows light in the vertical polarization state to pass, so the light in the horizontal polarization state is reflected by the reflective polarizer RP and passes through the first quarter-wave plate QWP1 again and is converted into the circular polarization state. Then, the light in the circular polarization state is reflected by the partial reflector BS and passes through the first quarter-wave plate QWP1 for the third time and is converted into the vertical polarization state, and then, the light in the vertical polarization state can pass through the reflective polarizer RP. Therefore, by such reflection means, the required total track length can be folded, and thus, the length of the optical system can be reduced. Moreover, the first quarter-wave plate, the second quarter-wave plate and the partial reflector may be coated on (or attached to) the optical lens surfaces, respectively, or they may be individual components with respect to the optical lens elements, and the present disclosure is not limited thereto. Moreover, the partial reflector is, for example but not limited to, a mirror having a reflection surface configured to reflect a specific amount of light. For example, in some cases, the partial reflector is configured to allow a portion of light to pass therethrough and reflect the other portion of the light.

Figure 12:
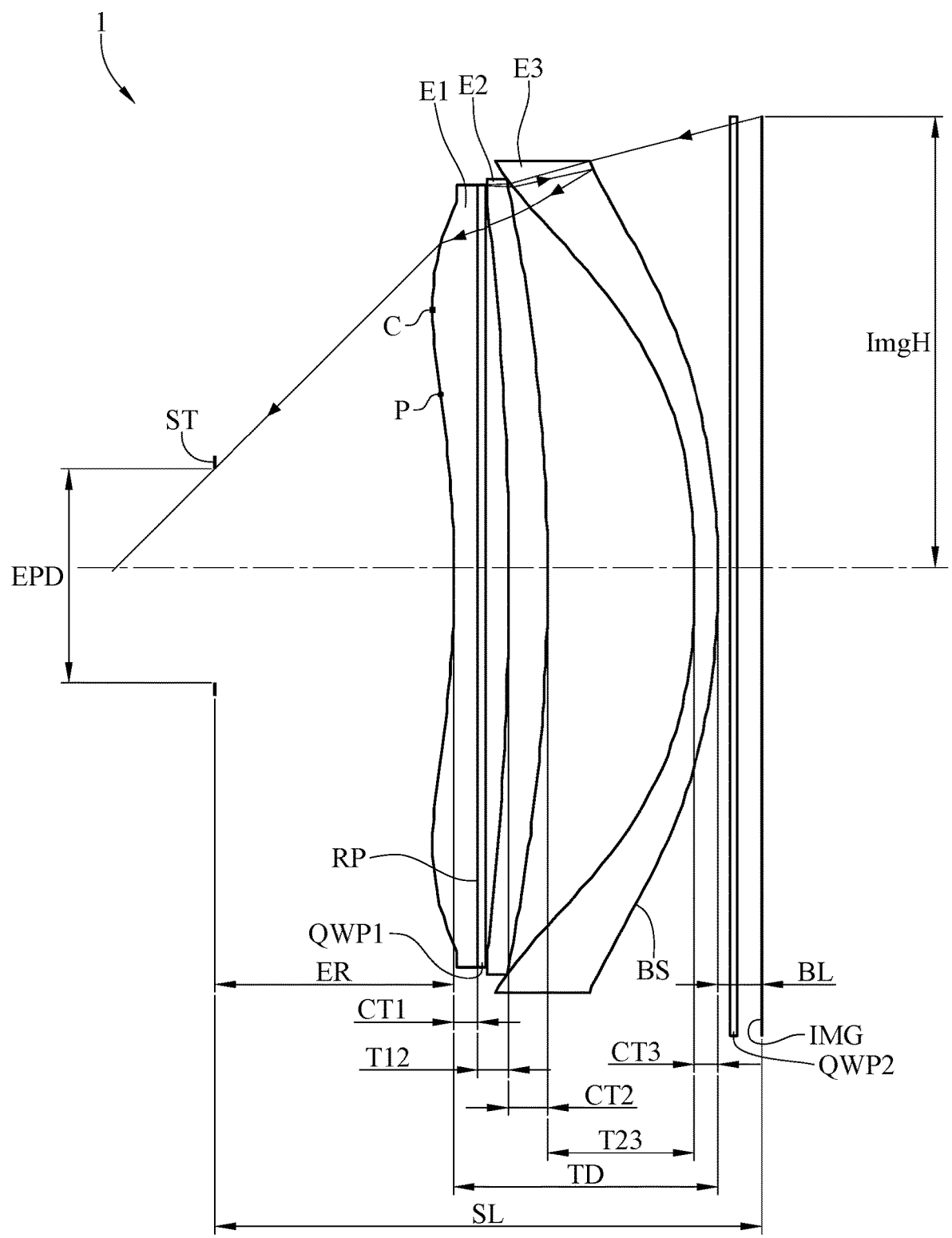
FIG. 12 shows a schematic view of ImgH, CT1, CT2, CT3, T12, T23, ER, EPD, BL, TD, SL and one inflection point and one critical point of a first optical lens element according to the 1st embodiment of the present disclosure.

At least one optical lens element of the optical system can have an inflection point. Therefore, it is favorable for peripheral imaging and aberration corrections. Please refer to FIG. 12, which shows a schematic view of the inflection point P of the front-side surface of the first optical lens element E1 according to the 1st embodiment of the present disclosure. The inflection point P of the front-side surface of the first optical lens element E1 in FIG. 12 is only exemplary. Each of the optical lens elements in various embodiments of the present disclosure can have one or more inflection points.

At least one optical lens element of the optical system can have a critical point. Therefore, it is favorable for peripheral imaging and aberration corrections. Please refer to FIG. 12, which shows a schematic view of the critical point C of the front-side surface of the first optical lens element E1 according to the 1st embodiment of the present disclosure. The critical point C of the front-side surface of the first optical lens element E1 in FIG. 12 is only exemplary. Each of the optical lens elements in various embodiments of the present disclosure can have one or more critical points.

When an Abbe number of the second optical lens element is V2, and a refractive index of the second optical lens element is N2, the following condition can be satisfied: $18<V2/N2<47$. Therefore, it is favorable for preventing overly large differences in refractive indices caused by angle difference due to light reflections, thereby ensuring the image quality. Moreover, the following condition can also be satisfied: $25<V2/N2<40.0$. Moreover, the following condition can also be satisfied: $30<V2/N2<38$.

When a central thickness of the first optical lens element is CT1, a central thickness of the second optical lens element is CT2, and a central thickness of the third optical lens element is CT3, the following conditions can be satisfied: $CT2>CT1$; and $CT2>CT3$. Therefore, it is favorable for increasing the use efficiency of the optical lens element. Please refer to FIG. 12, which shows a schematic view of CT1, CT2 and CT3 according to the 1st embodiment of the present disclosure.

When a focal length of the optical system is f, and a focal length of the third optical lens element is f3, the following condition can be satisfied: $-10<f/f3<0$. Therefore, it is favorable for improving the image quality. Moreover, the following condition can also be satisfied: $-5<f/f3<0$. Moreover, the following condition can also be satisfied: $-1<f/f3<0$.

When the focal length of the optical system is f, and a focal length of the second optical lens element is f2, the following condition can be satisfied: $0<f/f2$. Therefore, it is favorable for reducing the total length of the optical system. Moreover, the following condition can also be satisfied: $0.28<f/f2<1$.

When a focal length of the first optical lens element is f1, the focal length of the second optical lens element is f2, and the focal length of the third optical lens element is f3, the following condition can be satisfied: $1.1<(f2+f3)/f1$. Therefore, it is favorable for increasing the use efficiency of the optical system of reflective and refractive type. Moreover, the following condition can also be satisfied: $10<(f2+f3)/f1$. Moreover, the following condition can also be satisfied: $100<(f2+f3)/f1$.

When an axial distance between a rear-side surface of the first optical lens element and a front-side surface of the second optical lens element is T12, and the central thickness of the second optical lens element is CT2, the following condition can be satisfied: $0.55<T12/CT2<1.40$. Therefore, it is favorable for increasing the use efficiency of the second optical lens element. Moreover, the following condition can also be satisfied: $0.57<T12/CT2<1.27$. Please refer to FIG. 12, which shows a schematic view of T12 and CT2 according to the 1st embodiment of the present disclosure.

When the central thickness of the first optical lens element is CT1, the central thickness of the second optical lens element is CT2, the central thickness of the third optical lens element is CT3, the axial distance between the rear-side surface of the first optical lens element and the front-side surface of the second optical lens element is T12, and an axial distance between a rear-side surface of the second optical lens element and a front-side surface of the third optical lens element is T23, the following condition can be satisfied: $0<(CT1+CT2+CT3)/(T12+T23)<1.75$. Therefore, it is favorable for reducing the length of the optical lens assembly, which includes the first to third optical lens elements. Moreover, the following condition can also be satisfied: $0.1<(CT1+CT2+CT3)/(T12+T23)<1.7$. Moreover, the following condition can also be satisfied: $0.4<(CT1+CT2+CT3)/(T12+T23)<1.4$. Please refer to FIG. 12, which shows a schematic view of CT1, CT2, CT3, T12 and T23 according to the 1st embodiment of the present disclosure.

When the axial distance between the rear-side surface of the first optical lens element and the front-side surface of the second optical lens element is T12, the axial distance between the rear-side surface of the second optical lens element and the front-side surface of the third optical lens element is T23, and an axial distance between the front-side surface of the first optical lens element and a rear-side surface of the third optical lens element is TD, the following condition can be satisfied: $0.37<(T12+T23)/TD<1$. Therefore, it is favorable for increasing the use efficiency of the optical lens assembly. Moreover, the following condition can also be satisfied: $0.42<(T12+T23)/TD<0.8$. Please refer to FIG. 12, which shows a schematic view of T12, T23 and TD according to the 1st embodiment of the present disclosure.

When the axial distance between the rear-side surface of the first optical lens element and the front-side surface of the second optical lens element is T12, the axial distance between the rear-side surface of the second optical lens element and the front-side surface of the third optical lens element is T23, and an axial distance between the rear-side surface of the third optical lens element and the image surface is BL, the following condition can be satisfied: $1.20<(T12+T23)/BL<5.20$. Therefore, it is favorable for reducing the distance between the optical lens assembly and the image surface. Moreover, the following condition can also be satisfied: $1.50<(T12+T23)/BL<4.20$. Please refer to FIG. 12, which shows a schematic view of T12, T23 and BL according to the 1st embodiment of the present disclosure.

When the central thickness of the first optical lens element is CT1, the central thickness of the second optical lens element is CT2, the central thickness of the third optical lens element is CT3, and an axial distance between the aperture stop and the image surface is SL, the following condition can be satisfied: $0.10<(CT1+CT2+CT3)/SL<0.35$. Therefore, it is favorable for reducing the total length of the optical system. Moreover, the following condition can also be satisfied: $0.13<(CT1+CT2+CT3)/SL<0.27$. Please refer to FIG. 12, which shows a schematic view of CT1, CT2, CT3 and SL according to the 1st embodiment of the present disclosure.

When a curvature radius of the front-side surface of the third optical lens element is R5, and a curvature radius of the rear-side surface of the third optical lens element is R6, the following condition can be satisfied: $0.01<|R5/R6|<1$. Therefore, it is favorable for improving the image quality. Moreover, the following condition can also be satisfied: $0.3<|R5/R6|<1$. Moreover, the following condition can also be satisfied: $0.55<|R5/R6|<1$.

When the curvature radius of the front-side surface of the third optical lens element is R5, and the curvature radius of the rear-side surface of the third optical lens element is R6, the following condition can be satisfied: $3.85<|(R5+R6)/(R5-R6)|$. Therefore, it is favorable for reducing the back focal length of the optical system. Moreover, the following condition can also be satisfied: $4<|(R5+R6)/(R5-R6)|<300$.

When the curvature radius of the front-side surface of the third optical lens element is R5, and the curvature radius of the rear-side surface of the third optical lens element is R6, the following condition can be satisfied: $(R5+R6)/(R5-R6)<0$. Therefore, it is favorable for balancing the image quality and the back focal length. Moreover, the following condition can also be satisfied: $-300<(R5+R6)/(R5-R6)<-3$.

When the focal length of the optical system f, and an image height on the image surface (which can be half of a diagonal length of the display unit) is ImgH, the following condition can be satisfied: $0<f/ImgH<1.20$. Therefore, it is favorable for providing larger images. Moreover, the following condition can also be satisfied: $0<f/ImgH<1.05$. Please refer to FIG. 12, which shows a schematic view of ImgH according to the 1st embodiment of the present disclosure.

When the axial distance between the aperture stop and the image surface is SL, and the image height on the image surface is ImgH, the following condition can be satisfied: $0.50<SL/ImgH<1.17$. Therefore, it is favorable for balancing the image size and the length of the optical system.

When the axial distance between the aperture stop and the image surface is SL, and the focal length of the optical system is f, the following condition can be satisfied: 1.08<SL/f<1.40. Therefore, it is favorable for balancing the image quality and the length of the optical system. Moreover, the following condition can also be satisfied: 1.15<SL/f<1.25.

When a size of the aperture stop is EPD, and the image height on the image surface is ImgH, the following condition can be satisfied: 0.380<EPD/ImgH<0.476. Therefore, it is favorable for providing the user with better immersive experiences. Please refer to FIG. 12, which shows a schematic view of EPD and ImgH according to the 1st embodiment of the present disclosure.

When half of a maximum field of view of the optical system is HFOV, and the focal length of the optical system is f, the following condition can be satisfied: 0.05<tan (HFOV)/f<0.08. Therefore, it is favorable for providing better stereoscopic images.

At least one optical lens element of the optical system can be a metalens element. Therefore, it is favorable for reducing the total thickness of the head-mounted device.

At least one lens surface of at least one of the first optical lens element, the second optical lens element and the third optical lens element can have an anti-reflection layer, and the anti-reflection layer is a subwavelength structure. Therefore, it is favorable for preventing stray light from influencing the image quality.

The optical system can further include a fourth optical lens element located between the aperture stop and the image surface. Therefore, it is favorable for improving the image quality.

The present disclosure provides a head-mounted device. The head-mounted device includes a display unit, a digital signal processor, an inertial measurement unit, a support structure and the aforementioned optical system. The display unit is configured to face a user's eye to display an image, the digital signal processor is in signal communication with the display unit and the inertial measurement unit, and the support structure is configured to be worn on the user's head. The optical system corresponds to an eye of the user. In some configurations, the head-mounted device can include two optical systems as described above, and the two optical systems respectively correspond to two eyes of the user.

The head-mounted device can further include an iris recognition module in signal communication with the digital signal processor, and the iris recognition module is configured to recognize the user's iris. Therefore, it is favorable for providing convenient and safe account verification for the user.

The optical system can further include a polarizing element located between the display unit and the partial reflector, and the display unit can be an organic light emitting diode (OLED) panel and can include a color filter. Therefore, the organic light emitting diode panel provides better color images. Moreover, the OLED panel filters light by the color filter, and the OLED panel may not have a polarizing element therein. As such, light emitted from the display unit is polarized by the polarizing element located between the display unit and the partial reflector. Moreover, the OLED panel can be a micro LED panel or a mini LED panel.

The head-mounted device can further include a compacting mechanism configured for reducing dimensions of the head-mounted device. For example, the compacting mechanism is configured such that the dimensions of the head-mounted device can be reduced (e.g., folding the head-mounted device) when the head-mounted device is not in use.

The head-mounted device can further include an auto focus unit disposed corresponding to the optical system, and the auto focus unit is configured to move at least one optical lens element of the optical system. Therefore, the auto focus unit provides the optical system with a focus function, so that the focal length is adjustable according to the vision of various users. In some configurations, the number of the optical systems is two, the number of the auto focus unit is one, and the auto focus unit is capable of adjusting the focal lengths of the two optical systems. In some other configurations, the number of the optical systems is two, the number of the auto focus units is two, and the two auto focus units are configured to adjust the focal lengths of the two optical systems, respectively.

The head-mounted device can further include a liquid crystal focus module disposed between the aperture stop and the image surface, and the liquid crystal focus module is configured to provide the optical system with a larger adjustment range of focal length.

The head-mounted device can further include a camera in signal communication with the digital signal processor, and the camera is configured to capture an image of external environment for displaying on the display unit. Therefore, the image of external environment captured by the camera can be instantly displayed on the display unit, so that the user wearing the head-mounted device is able to recognize the environment.

The head-mounted device can further include an eye tracking unit configured to face the user's eye(s) so as to track the gaze position of the eye(s). Therefore, it is favorable for providing the user with data analysis of various usage scenarios (e.g., user's gaze target analysis or concentration analysis when the user is play video games or watching movies), and adjusting the clarity of each area of an image according to the gaze area of the eye(s).

The head-mounted device can further include a diamond like carbon (DLC) film layer configured to cool components (e.g., the display unit) which generate heat in the head-mounted device. Therefore, the DLC film layer provides better heat dissipation efficiency. Moreover, the DLC film layer can be located at, for example, at least one of a screen of the display unit, a heat dissipation module of the head-mounted device and an inner surface and an outer surface of a casing of the head-mounted device.

Note that when one component is said to be in signal communication with another component in the descriptions above and below, the two components may transfer and receive signals between each other wirelessly or via a signal cable.

According to the present disclosure, the aforementioned features and conditions can be utilized in numerous combinations so as to achieve corresponding effects.

According to the present disclosure, the optical lens elements of the optical system can be made of either glass or plastic material. When the optical lens elements are made of glass material, the refractive power distribution of the optical system may be more flexible, and the influence on imaging caused by external environment temperature change may be reduced. The glass optical lens element can either be made by grinding or molding. When the optical lens elements are made of plastic material, the manufacturing costs can be effectively reduced. Furthermore, lens surfaces of each optical lens element can be arranged to be spherical or aspheric. Spherical optical lens elements are simple in manufacture. Aspheric optical lens element design allows more control variables for eliminating aberrations thereof and reducing the required number of optical lens elements, and the length of the optical system can therefore be effectively shortened. Additionally, the aspheric lens surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, one or more of the optical lens elements' material may optionally include an additive which alters the optical lens elements' transmittance in a specific range of wavelength for a reduction in unwanted stray light or color deviation. For example, the additive may optionally filter out light in the wavelength range of 600 nm to 800 nm to reduce excessive red light and/or near infrared light; or may optionally filter out light in the wavelength range of 350 nm to 450 nm to reduce excessive blue light and/or near ultraviolet light from interfering the final image. The additive may be homogeneously mixed with a plastic material to be used in manufacturing a mixed-material optical lens element by injection molding. Moreover, the additive may be coated on the lens surfaces to provide the abovementioned effects.

According to the present disclosure, each of a front-side surface and a rear-side surface has a paraxial region and an off-axis region. The paraxial region refers to the region of the surface where light rays travel close to the optical axis, and the off-axis region refers to the region of the surface away from the paraxial region. Particularly, unless otherwise stated, when the optical lens element has a convex surface, it indicates that the surface is convex in the paraxial region thereof; when the optical lens element has a concave surface, it indicates that the surface is concave in the paraxial region thereof. Moreover, when a region of refractive power or focus of an optical lens element is not defined, it indicates that the region of refractive power or focus of the optical lens element is in the paraxial region thereof.

According to the present disclosure, an inflection point is a point on the lens surface of the optical lens element at which the lens surface changes from concave to convex, or vice versa. A critical point is a non-axial point of the lens surface where its tangent is perpendicular to the optical axis.

According to the present disclosure, the image surface of the optical system, based on the corresponding display unit, can be flat or curved, especially a curved surface being concave facing towards the front side of the optical system.

According to the present disclosure, an image correction unit, such as a field flattener, can be optionally disposed between the optical lens element closest to the rear side of the optical system along the optical path and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the design of the head-mounted device. In general, a preferable image correction unit is, for example, a thin transparent element having a concave front-side surface and a planar rear-side surface, and the thin transparent element is disposed near the image surface.

According to the present disclosure, the optical system can include at least one stop, such as an aperture stop, a glare stop or a field stop. Said glare stop or said field stop is set for eliminating the stray light and thereby improving image quality thereof.

According to the present disclosure, the optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the present disclosure, the optical system can include one or more optical elements for limiting the form of light passing through the optical system. Each optical element can be, but not limited to, a filter, a polarizer, etc., and each optical element can be, but not limited to, a single-piece element, a composite component, a thin film, etc. The optical element can be located at the front side or the rear side of the optical system or between any two adjacent optical lens elements so as to allow light in a specific form to pass through, thereby meeting application requirements.

According to the above description of the present disclosure, the following specific embodiments are provided for further explanation.

1st Embodiment

FIG. 1 is a schematic view of an optical system and a display unit according to the 1st embodiment of the present disclosure. The optical system 1 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 1 includes three optical lens elements (E1, E2, and E3) with no additional optical lens element disposed between each of the adjacent three optical lens elements.

The first optical lens element E1 with negative refractive power has a front-side surface being concave and a rear-side surface being planar. The first optical lens element E1 is made of plastic material and has the front-side surface being aspheric. The front-side surface of the first optical lens element E1 has at least one inflection point. The front-side surface of the first optical lens element E1 has at least one critical point.

The second optical lens element E2 with positive refractive power has a front-side surface being concave and a rear-side surface being convex. The second optical lens element E2 is made of plastic material and has the front-side surface and the rear-side surface being both spherical.

The third optical lens element E3 with negative refractive power has a front-side surface being concave and a rear-side surface being convex. The third optical lens element E3 is made of plastic material and has the front-side surface and the rear-side surface being both aspheric. The front-side surface of the third optical lens element E3 has at least one inflection point. The rear-side surface of the third optical lens element E3 has at least one inflection point.

The reflective polarizer RP is attached to the rear-side surface of the first optical lens element E1, and the first quarter-wave plate QWP1 is attached to the reflective polarizer RP.

The partial reflector BS is attached to the rear-side surface of the third optical lens element E3.

The second quarter-wave plate QWP2 is located between the partial reflector BS and the image surface IMG.

The equation of the aspheric surface profiles of the aforementioned optical lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,
- X is the displacement in parallel with an optical axis from an axial vertex on the aspheric surface to a point at a distance of Y from the optical axis on the aspheric surface;
- Y is the vertical distance from the point on the aspheric surface to the optical axis;
- R is the curvature radius;
- k is the conic coefficient; and
- Ai is the i-th aspheric coefficient, and in the embodiments, i may be, but is not limited to, 4, 6, 8, 10, 12, 14 and 16.

In the optical system 1 according to the 1st embodiment, when a focal length of the optical system 1 is f, an f-number of the optical system 1 is Fno, and half of a maximum field of view of the optical system 1 is HFOV, these parameters have the following values: f=19.09 millimeters (mm), Fno=2.12, and HFOV=45.0 degrees (deg.).

When an Abbe number of the second optical lens element E2 is V2, and a refractive index of the second optical lens element E2 is N2, the following condition is satisfied: V2/N2=36.269.

When a central thickness of the first optical lens element E1 is CT1, a central thickness of the second optical lens element E2 is CT2, and a central thickness of the third optical lens element E3 is CT3, the following conditions are satisfied: CT1=1.000 mm; CT2=1.606 mm; CT3=1.000 mm; CT2>CT1; and CT2>CT3.

When the focal length of the optical system 1 is f, and a focal length of the third optical lens element E3 is f3, the following condition is satisfied: f/f3=−6.082E-06.

When the focal length of the optical system 1 is f, and a focal length of the second optical lens element E2 is f2, the following condition is satisfied: f/f2=0.051.

When a focal length of the first optical lens element E1 is f1, the focal length of the second optical lens element E2 is f2, and the focal length of the third optical lens element E3 is f3, the following condition is satisfied: (f2+f3)/f1=41007.129.

When an axial distance between the rear-side surface of the first optical lens element E1 and the front-side surface of the second optical lens element E2 is T12, and the central thickness of the second optical lens element E2 is CT2, the following condition is satisfied: T12/CT2=0.805.

When the central thickness of the first optical lens element E1 is CT1, the central thickness of the second optical lens element E2 is CT2, the central thickness of the third optical lens element E3 is CT3, the axial distance between the rear-side surface of the first optical lens element E1 and the front-side surface of the second optical lens element E2 is T12, and an axial distance between the rear-side surface of the second optical lens element E2 and the front-side surface of the third optical lens element E3 is T23, the following condition is satisfied: (CT1+CT2+CT3)/(T12+T23)=0.485.

When the axial distance between the rear-side surface of the first optical lens element E1 and the front-side surface of the second optical lens element E2 is T12, the axial distance between the rear-side surface of the second optical lens element E2 and the front-side surface of the third optical lens element E3 is T23, and an axial distance between the front-side surface of the first optical lens element E1 and the rear-side surface of the third optical lens element E3 is TD, the following condition is satisfied: (T12+T23)/TD=0.673.

When the axial distance between the rear-side surface of the first optical lens element E1 and the front-side surface of the second optical lens element E2 is T12, the axial distance between the rear-side surface of the second optical lens element E2 and the front-side surface of the third optical lens element E3 is T23, and an axial distance between the rear-side surface of the third optical lens element E3 and the image surface IMG is BL, the following condition is satisfied: (T12+T23)/BL=4.175.

When the central thickness of the first optical lens element E1 is CT1, the central thickness of the second optical lens element E2 is CT2, the central thickness of the third optical lens element E3 is CT3, and an axial distance between the aperture stop ST and the image surface IMG is SL, the following condition is satisfied: (CT1+CT2+CT3)/SL=0.158.

When a curvature radius of the front-side surface of the third optical lens element E3 is R5, and a curvature radius of the rear-side surface of the third optical lens element E3 is R6, the following condition is satisfied: |R5/R6|=0.990.

When the curvature radius of the front-side surface of the third optical lens element E3 is R5, and the curvature radius of the rear-side surface of the third optical lens element E3 is R6, the following condition is satisfied: |(R5+R6)/(R5−R6)|=202.318.

When the curvature radius of the front-side surface of the third optical lens element E3 is R5, and the curvature radius of the rear-side surface of the third optical lens element E3 is R6, the following condition is satisfied: (R5+R6)/(R5−R6)=−202.318.

When the focal length of the optical system 1 is f, and an image height on the image surface IMG is ImgH, the following condition is satisfied: f/ImgH=1.009.

When the axial distance between the aperture stop ST and the image surface IMG is SL, and the image height on the image surface IMG is ImgH, the following condition is satisfied: SL/ImgH=1.206.

When the axial distance between the aperture stop ST and the image surface IMG is SL, and the focal length of the optical system 1 is f, the following condition is satisfied: SL/f=1.195.

When a size of the aperture stop ST is EPD, and the image height on the image surface IMG is ImgH, the following condition is satisfied: EPD/ImgH=0.476.

When half of the maximum field of view of the optical system 1 is HFOV, and the focal length of the optical system 1 is f, the following condition is satisfied: tan(HFOV)/f=0.052.

When a curvature radius of the front-side surface of the first optical lens element E1 is R1, and the curvature radius of the rear-side surface of the third optical lens element E3 is R6, the following condition is satisfied: R1/R6=1.160.

When the curvature radius of the front-side surface of the first optical lens element E1 is R1, and a curvature radius of the rear-side surface of the first optical lens element E1 is R2, the following condition is satisfied: (R1+R2)/(R1−R2)=−1.000.

When a curvature radius of the front-side surface of the second optical lens element E2 is R3, and a curvature radius of the rear-side surface of the second optical lens element E2 is R4, the following condition is satisfied: (R3+R4)/(R3−R4)=4.039.

When the axial distance between the front-side surface of the first optical lens element E1 and the rear-side surface of the third optical lens element E3 is TD, and the axial distance between the aperture stop ST and the image surface IMG is SL, the following condition is satisfied: TD/SL=0.484.

When an axial distance between the aperture stop ST and the front-side surface of the first optical lens element E1 is ER, and the axial distance between the aperture stop ST and the image surface IMG is SL, the following condition is satisfied: ER/SL=0.438. Please refer to FIG. 12, which shows a schematic view of ER according to the 1st embodiment of the present disclosure.

The detailed optical data of the 1st embodiment are shown in Table 1A and the aspheric surface data are shown in Table 1B below.

In Table 1A, the curvature radius and the thickness are shown in millimeters (mm). Surface numbers 23-0 represent the surfaces sequentially passed through by light from the image surface IMG to the aperture stop ST. In Table 1B, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1A and Table 1B of the 1st embodiment. Therefore, an explanation in this regard will not be provided again.

2nd Embodiment

Figure 2:
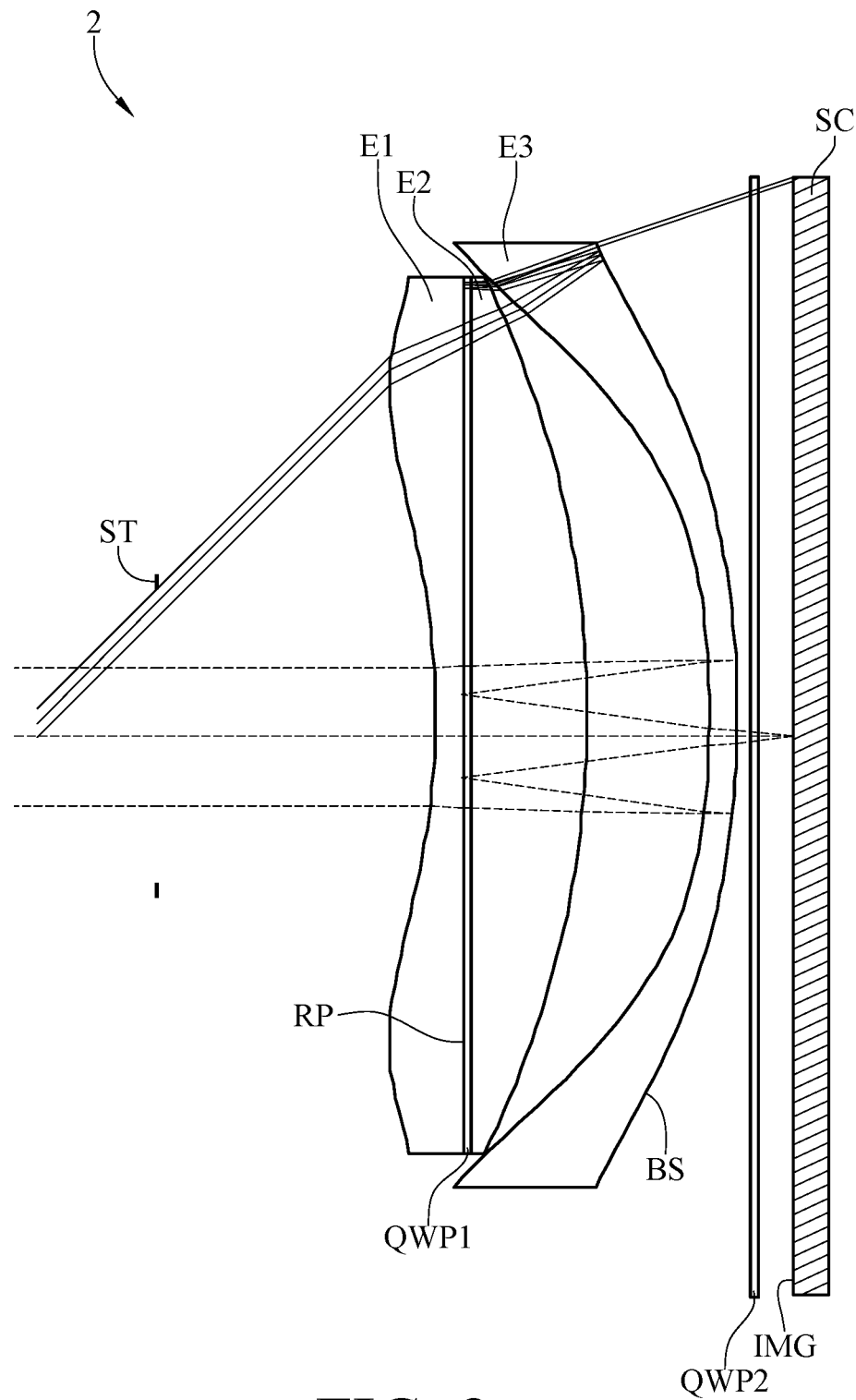
FIG. 2 is a schematic view of an optical system and a display unit according to the 2nd embodiment of the present disclosure.

FIG. 2 is a schematic view of an optical system and a display unit according to the 2nd embodiment of the present disclosure. The optical system 2 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 2 includes three optical lens elements (E1, E2, and E3) with no additional optical lens element disposed between each of the adjacent three optical lens elements.

The first optical lens element E1 with negative refractive power has a front-side surface being concave and a rear-side surface being planar. The first optical lens element E1 is made of plastic material and has the front-side surface being aspheric. The front-side surface of first optical lens element E1 has at least one inflection point. The front-side surface of first optical lens element E1 has at least one critical point.

TABLE 1A

1st Embodiment
f = 19.09 mm, Fno = 2.12, HFOV = 45.0 deg.

| Surface # | | Curvature Radius | Thickness | Material | Index | Abbe # | Refraction/Reflection |
|---|---|---|---|---|---|---|---|
| 0 | | Plano | 1E+08 | | | | Refraction |
| 1 | | Plano | 2.500 | | | | Refraction |
| 2 | ST | Plano | 10.000 | | | | Refraction |
| 3 | E1 | −41.6288 (ASP) | 1.000 | Plastic | 1.544 | 56.0 | Refraction |
| 4 | QWP1 | Plano | 0.293 | | | | Refraction |
| 5 | | Plano | 1.000 | | | | Refraction |
| 6 | E2 | −135.2667 (SPH) | 1.606 | Plastic | 1.544 | 56.0 | Refraction |
| 7 | | −81.5836 (SPH) | 6.138 | | | | Refraction |
| 8 | E3 | −35.5427 (ASP) | 1.000 | Plastic | 1.544 | 56.0 | Refraction |
| 9 | BS | −35.8958 (ASP) | −1.000 | Plastic | 1.544 | 56.0 | Reflection |
| 10 | | −35.5427 (ASP) | −6.138 | | | | Refraction |
| 11 | E2 | −81.5836 (SPH) | −1.606 | Plastic | 1.544 | 56.0 | Refraction |
| 12 | | −135.2667 (SPH) | −1.000 | | | | Refraction |
| 13 | QWP1 | Plano | −0.293 | | | | Refraction |
| 14 | QWP1 | Plano | 0.293 | | | | Reflection |
| 15 | | Plano | 1.000 | | | | Refraction |
| 16 | E2 | −135.2667 (SPH) | 1.606 | Plastic | 1.544 | 56.0 | Refraction |
| 17 | | −81.5836 (SPH) | 6.138 | | | | Refraction |
| 18 | E3 | −35.5427 (ASP) | 1.000 | Plastic | 1.544 | 56.0 | Refraction |
| 19 | | −35.8958 (ASP) | 0.500 | | | | Refraction |
| 20 | QWP2 | Plano | 0.293 | | | | Refraction |
| 21 | | Plano | 0.807 | | | | Refraction |
| 22 | | Plano | 0.093 | | | | Refraction |
| 23 | IMG | Plano | 0.100 | | | | Refraction |

Note:
Reference wavelength is 587.6 nm (d-line).
The reflective polarizer RP is located between the first optical lens element E1 and the first quarter-wave plate QWP1.
The thickness of the reflective polarizer RP is included in the thickness of the first quarter-wave plate QWP1 in this table.

TABLE 1B

Aspheric Coefficients

| Surface # | 3 | 4 | 6 | 7 | 8 | 9 |
|---|---|---|---|---|---|---|
| k= | −80.34579 | — | — | — | 1.00000 | −10.93496 |
| A4= | 0.43313 | — | — | — | −3.80888 | −2.85659 |
| A6= | 0.43793 | — | — | — | 0.65515 | 0.48114 |
| A8= | −0.07163 | — | — | — | — | −0.00690 |
| A10= | — | — | — | — | — | 0.01995 |
| A12= | — | — | — | — | — | 0.00526 |
| A14= | — | — | — | — | — | 0.00112 |
| A16= | — | — | — | — | — | −0.00001 |

The second optical lens element E2 with positive refractive power has a front-side surface being planar and a rear-side surface being convex. The second optical lens element E2 is made of plastic material and has the rear-side surface being spherical.

The third optical lens element E3 with negative refractive power has a front-side surface being concave and a rear-side surface being convex. The third optical lens element E3 is made of plastic material and has the front-side surface and the rear-side surface being both aspheric. The front-side surface of the third optical lens element E3 has at least one inflection point. The rear-side surface of the third optical lens element E3 has at least one inflection point.

The reflective polarizer RP is attached to the rear-side surface of the first optical lens element E1, and the first quarter-wave plate QWP1 is attached to the reflective polarizer RP.

The partial reflector BS is attached to the rear-side surface of the third optical lens element E3.

The second quarter-wave plate QWP2 is located between the partial reflector BS and the image surface IMG.

The detailed optical data of the 2nd embodiment are shown in Table 2A and the aspheric surface data are shown in Table 2B below.

TABLE 2A

2nd Embodiment
f = 19.03 mm, Fno = 2.11, HFOV = 45.0 deg.

| Surface # | | Curvature Radius | Thickness | Material | Index | Abbe # | Refraction/Reflection |
|---|---|---|---|---|---|---|---|
| 0 | | Plano | 1E+08 | | | | Refraction |
| 1 | | Plano | 2.500 | | | | Refraction |
| 2 | ST | Plano | 10.000 | | | | Refraction |
| 3 | | −24.9117 (ASP) | 1.000 | Plastic | 1.544 | 56.0 | Refraction |
| 4 | QWP1 | Plano | 0.293 | | | | Refraction |
| 5 | E2 | Plano | 4.120 | Plastic | 1.544 | 56.0 | Refraction |
| 6 | | −35.5817 (SPH) | 4.377 | | | | Refraction |
| 7 | E3 | −38.1253 (ASP) | 1.000 | Plastic | 1.544 | 56.0 | Refraction |
| 8 | BS | −38.4784 (ASP) | −1.000 | Plastic | 1.544 | 56.0 | Reflection |
| 9 | | −38.1253 (ASP) | −4.377 | | | | Refraction |
| 10 | E2 | −35.5817 (SPH) | −4.120 | Plastic | 1.544 | 56.0 | Refraction |
| 11 | QWP1 | Plano | −0.293 | | | | Refraction |
| 12 | QWP1 | Plano | 0.293 | | | | Reflection |
| 13 | E2 | Plano | 4.120 | Plastic | 1.544 | 56.0 | Refraction |
| 14 | | −35.5817 (SPH) | 4.377 | | | | Refraction |
| 15 | E3 | −38.1253 (ASP) | 1.000 | Plastic | 1.544 | 56.0 | Refraction |
| 16 | | −38.4784 (ASP) | 0.500 | | | | Refraction |
| 17 | QWP2 | Plano | 0.293 | | | | Refraction |
| 18 | | Plano | 0.807 | | | | Refraction |
| 19 | | Plano | 0.381 | | | | Refraction |
| 20 | IMG | Plano | 0.100 | | | | Refraction |

Note:
Reference wavelength is 587.6 nm (d-line).
The reflective polarizer RP is located between the first optical lens element E1 and the first quarter-wave plate QWP1.
The thickness of the reflective polarizer RP is included in the thickness of the first quarter-wave plate QWP1 in this table.

TABLE 2B

Aspheric Coefficients

| Surface # | 3 | 4 | 5 | 6 | 7 | 8 |
|---|---|---|---|---|---|---|
| k= | −25.35240 | — | — | — | 0.12735 | −20.02253 |
| A4= | −0.23694 | — | — | — | −4.50974 | −3.16094 |
| A6= | 0.39742 | — | — | — | 0.52327 | 0.53727 |
| A8= | −0.05266 | — | — | — | — | −0.03480 |
| A10= | — | — | — | — | — | 0.01634 |
| A12= | — | — | — | — | — | 0.00225 |

TABLE 2B-continued

Aspheric Coefficients

| Surface # | 3 | 4 | 5 | 6 | 7 | 8 |
|---|---|---|---|---|---|---|
| A14= | — | — | — | — | — | 0.00038 |
| A16= | — | — | — | — | — | −0.00014 |

In the 2nd embodiment, the equation of the aspheric surface profiles of the aforementioned optical lens elements is the same as the equation of the 1st embodiment. Also, the definitions of these parameters shown in Table 2C below are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions:

TABLE 2C

| Values of Conditional Expressions | | | |
|---|---|---|---|
| f [mm] | 19.03 | (CT1 + CT2 + CT3)/SL | 0.262 |
| HFOV [deg.] | 45.0 | \|R5/R6\| | 0.991 |
| Fno | 2.11 | \|(R5 + R6)/(R5 − R6)\| | 216.946 |
| V2/N2 | 36.269 | (R5 + R6)/(R5 − R6) | −216.946 |
| CT1 | 1.000 | f/ImgH | 1.003 |
| CT2 | 4.120 | SL/ImgH | 1.232 |
| CT3 | 1.000 | SL/f | 1.228 |
| f/f3 | −5.272E−06 | EPD/ImgH | 0.474 |
| f/f2 | 0.291 | tan(HFOV)/f | 0.053 |
| (f2 + f3)/f1 | 78801.084 | R1/R6 | 0.647 |
| T12/CT2 | 0.071 | (R1 + R2)/(R1 − R2) | −1.000 |
| (CT1 + CT2 + CT3)/(T12 + T23) | 1.310 | (R3 + R4)/(R3 − R4) | 1.000 |
| (T12 + T23)/TD | 0.433 | TD/SL | 0.462 |
| (T12 + T23)/BL | 1.812 | ER/SL | 0.428 |

3rd Embodiment

Figure 3:
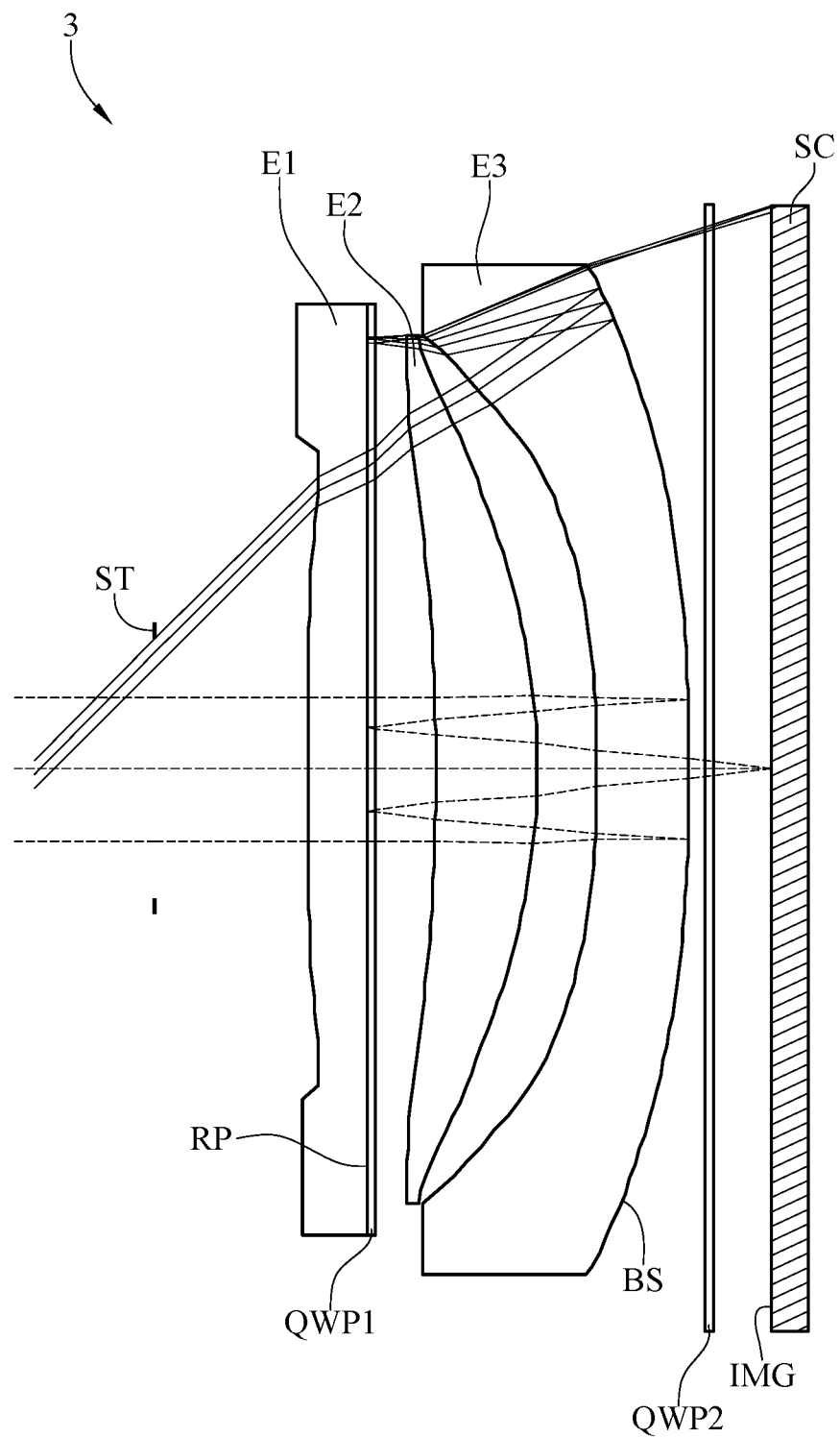
FIG. 3 is a schematic view of an optical system and a display unit according to the 3rd embodiment of the present disclosure.

FIG. 3 is a schematic view of an optical system and a display unit according to the 3rd embodiment of the present disclosure. The optical system 3 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 3 includes three optical lens elements (E1, E2, and E3) with no additional optical lens element disposed between each of the adjacent three optical lens elements.

The first optical lens element E1 with negative refractive power has a front-side surface being concave and a rear-side surface being planar. The first optical lens element E1 is made of plastic material and has the front-side surface being aspheric. The front-side surface of the first optical lens element E1 has at least one inflection point. The front-side surface of the first optical lens element E1 has at least one critical point.

The second optical lens element E2 with positive refractive power has a front-side surface being concave and a rear-side surface being convex. The second optical lens element E2 is made of plastic material and has the front-side surface and the rear-side surface being both aspheric. The front-side surface of the second optical lens element E2 has at least one inflection point. The rear-side surface of the second optical lens element E2 has at least one inflection point.

The third optical lens element E3 with negative refractive power has a front-side surface being concave and a rear-side surface being convex. The third optical lens element E3 is made of plastic material and has the front-side surface and the rear-side surface being both aspheric.

The reflective polarizer RP is attached to the rear-side surface of the first optical lens element E1, and the first quarter-wave plate QWP1 is attached to the reflective polarizer RP.

The partial reflector BS is attached to the rear-side surface of the third optical lens element E3.

The second quarter-wave plate QWP2 is located between the partial reflector BS and the image surface IMG.

The detailed optical data of the 3rd embodiment are shown in Table 3A and the aspheric surface data are shown in Table 3B below.

TABLE 3A

3rd Embodiment
f = 18.96 mm, Fno = 2.11, HFOV = 45.0 deg.

| Surface # | | Curvature Radius | Thickness | Material | Index | Abbe # | Refraction/Reflection |
|---|---|---|---|---|---|---|---|
| 0 | | Plano | 1E+08 | | | | Refraction |
| 1 | | Plano | 2.500 | | | | Refraction |
| 2 | ST | Plano | 5.294 | | | | Refraction |
| 3 | E1 | −1299.3224 (ASP) | 2.000 | Plastic | 1.544 | 56.0 | Refraction |
| 4 | QWP1 | Plano | 0.293 | | | | Refraction |
| 5 | | Plano | 2.078 | | | | Refraction |
| 6 | E2 | −90.2411 (ASP) | 3.502 | Plastic | 1.544 | 56.0 | Refraction |
| 7 | | −22.4511 (ASP) | 2.040 | | | | Refraction |
| 8 | E3 | −45.3716 (ASP) | 3.186 | Plastic | 1.544 | 56.0 | Refraction |
| 9 | BS | −79.5664 (ASP) | −3.186 | Plastic | 1.544 | 56.0 | Reflection |
| 10 | | −45.3716 (ASP) | −2.040 | | | | Refraction |
| 11 | E2 | −22.4511 (ASP) | −3.502 | Plastic | 1.544 | 56.0 | Refraction |
| 12 | | −90.2411 (ASP) | −2.078 | | | | Refraction |
| 13 | QWP1 | Plano | −0.293 | | | | Refraction |
| 14 | QWP1 | Plano | 0.293 | | | | Reflection |
| 15 | | Plano | 2.078 | | | | Refraction |
| 16 | E2 | −90.2411 (ASP) | 3.502 | Plastic | 1.544 | 56.0 | Refraction |
| 17 | | −22.4511 (ASP) | 2.040 | | | | Refraction |
| 18 | E3 | −45.3716 (ASP) | 3.186 | Plastic | 1.544 | 56.0 | Refraction |
| 19 | | −79.5664 (ASP) | 0.500 | | | | Refraction |
| 20 | QWP2 | Plano | 0.293 | | | | Refraction |

TABLE 3A-continued

3rd Embodiment
f = 18.96 mm, Fno = 2.11, HFOV = 45.0 deg.

| Surface # | | Curvature Radius | Thickness | Material | Index | Abbe # | Refraction/ Reflection |
|---|---|---|---|---|---|---|---|
| 21 | | Plano | 0.807 | | | | Refraction |
| 22 | | Plano | 1.076 | | | | Refraction |
| 23 | IMG | Plano | 0.100 | | | | Refraction |

Note:
Reference wavelength is 587.6 nm (d-line).
The reflective polarizer RP is located between the first optical lens element E1 and the first quarter-wave plate QWP1.
The thickness of the reflective polarizer RP is included in the thickness of the first quarter-wave plate QWP1 in this table.

TABLE 3B

Aspheric Coefficients

| Surface # | 3 | 4 | 6 | 7 | 8 | 9 |
|---|---|---|---|---|---|---|
| k= | 1.00000 | — | -0.05535 | -2.63948 | -31.33474 | -85.59756 |
| A4= | 0.46364 | — | 0.01785 | -0.05606 | -3.56039 | -2.56489 |
| A6= | -0.08655 | — | -0.37062 | 0.00637 | 0.01452 | 0.23593 |
| A8= | -0.04376 | — | 0.01798 | -0.01020 | 0.05853 | -0.05199 |
| A10= | 0.00755 | — | 0.11511 | -0.01095 | 0.06724 | -0.01324 |
| A12= | 0.01548 | — | -0.03956 | 0.02718 | 0.00613 | -0.00907 |
| A14= | 0.00285 | — | 0.03536 | -0.00831 | -0.04638 | 0.00530 |
| A16= | -0.00013 | — | -0.65800 | 0.00071 | 0.00992 | 0.00009 |
| A18= | 0.00102 | — | -0.72837 | -0.00001 | 0.00267 | -0.01070 |
| A20= | -0.00221 | — | -0.20954 | 0.00002 | -0.00062 | -0.00059 |

In the 3rd embodiment, the equation of the aspheric surface profiles of the aforementioned optical lens elements is the same as the equation of the 1st embodiment. Also, the definitions of these parameters shown in Table 3C below are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions:

TABLE 3C

Values of Conditional Expressions

| f [mm] | 18.96 | (CT1 + CT2 + CT3)/SL | 0.410 |
|---|---|---|---|
| HFOV [deg.] | 45.0 | |R5/R6| | 0.570 |
| Fno | 2.11 | |(R5 + R6)/(R5 − R6)| | 3.654 |
| V2/N2 | 36.269 | (R5 + R6)/(R5 − R6) | -3.654 |
| CT1 | 2.000 | f/ImgH | 0.994 |
| CT2 | 3.502 | SL/ImgH | 1.111 |
| CT3 | 3.186 | SL/f | 1.118 |
| f/f3 | -9.447E-02 | EPD/ImgH | 0.472 |
| f/f2 | 0.351 | tan(HFOV)/f | 0.053 |
| (f2 + f3)/f1 | 0.061 | R1/R6 | 16.330 |
| T12/CT2 | 0.677 | (R1 + R2)/(R1 − R2) | -1.000 |
| (CT1 + CT2 + CT3)/(T12 + T23) | 1.969 | (R3 + R4)/(R3 − R4) | 1.662 |
| (T12 + T23)/TD | 0.337 | TD/SL | 0.618 |
| (T12 + T23)/BL | 1.578 | ER/SL | 0.250 |

4th Embodiment

Figure 4:
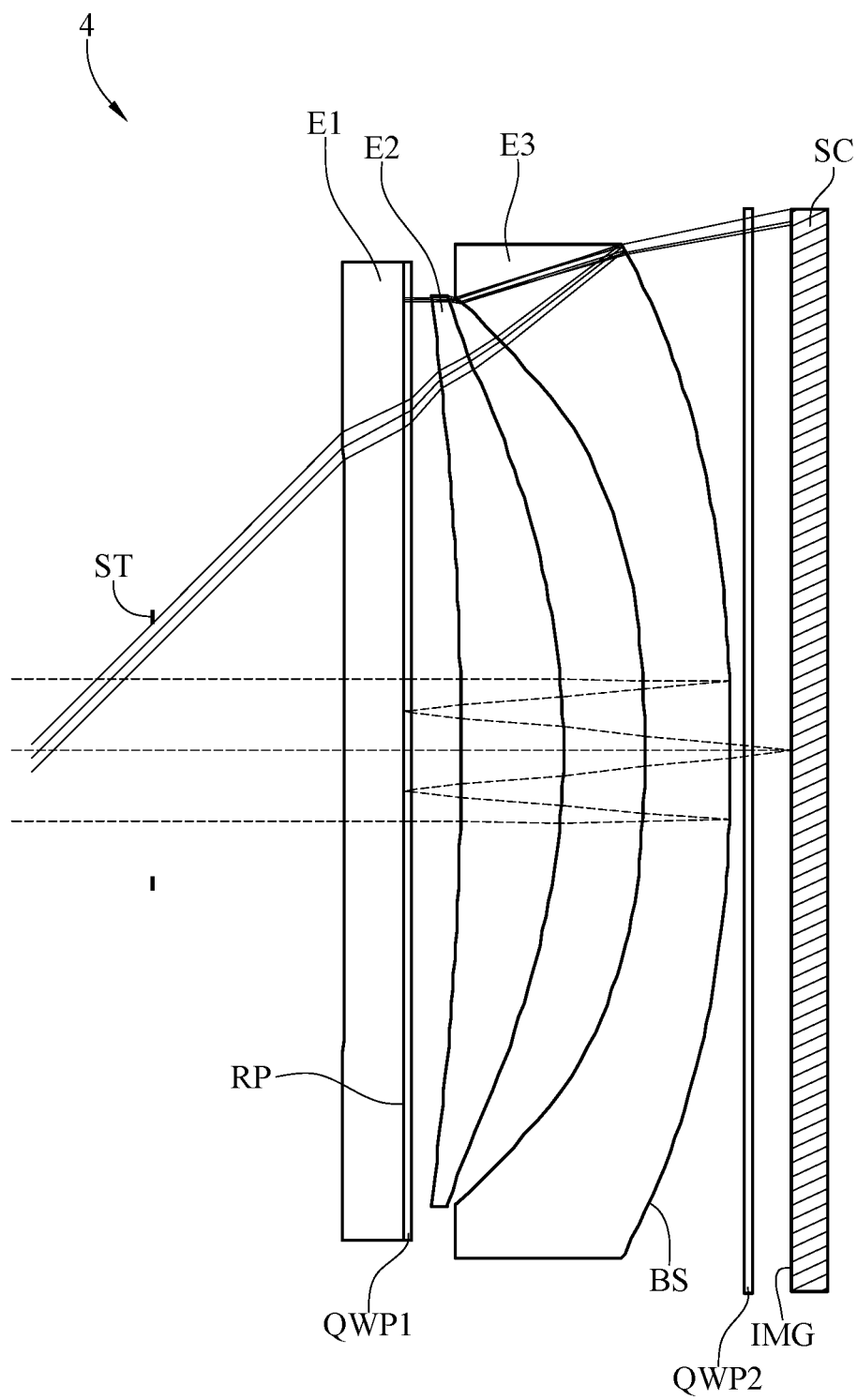
FIG. 4 is a schematic view of an optical system and a display unit according to the 4th embodiment of the present disclosure.

FIG. 4 is a schematic view of an optical system and a display unit according to the 4th embodiment of the present disclosure. The optical system 4 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 4 includes three optical lens elements (E1, E2, and E3) with no additional optical lens element disposed between each of the adjacent three optical lens elements.

The first optical lens element E1 with negative refractive power has a front-side surface being concave and a rear-side surface being planar. The first optical lens element E1 is made of plastic material and has the front-side surface being aspheric. The front-side surface of the first optical lens element E1 has at least one inflection point. The front-side surface of the first optical lens element E1 has at least one critical point.

The second optical lens element E2 with positive refractive power has a front-side surface being concave and a rear-side surface being convex. The second optical lens element E2 is made of plastic material and has the front-side surface and the rear-side surface being both aspheric. The front-side surface of the second optical lens element E2 has at least one inflection point. The rear-side surface of the second optical lens element E2 has at least one inflection point.

The third optical lens element E3 with negative refractive power has a front-side surface being concave and a rear-side surface being convex. The third optical lens element E3 is made of plastic material and has the front-side surface and the rear-side surface being both aspheric. The front-side surface of the third optical lens element E3 has at least one inflection point. The rear-side surface of the third optical lens element E3 has at least one inflection point.

The reflective polarizer RP is attached to the rear-side surface of the first optical lens element E1, and the first quarter-wave plate QWP1 is attached to the reflective polarizer RP.

The partial reflector BS is attached to the rear-side surface of the third optical lens element E3.

The second quarter-wave plate QWP2 is located between the partial reflector BS and the image surface IMG.

The detailed optical data of the 4th embodiment are shown in Table 4A and the aspheric surface data are shown in Table 4B below.

TABLE 4A

4th Embodiment
f = 19.26 mm, Fno = 2.14, HFOV = 45.0 deg.

| Surface # | | Curvature Radius | Thickness | Material | Index | Abbe # | Refraction/Reflection |
|---|---|---|---|---|---|---|---|
| 0 | | Plano | 1E+08 | | | | Refraction |
| 1 | | Plano | 2.500 | | | | Refraction |
| 2 | ST | Plano | 6.762 | | | | Refraction |
| 3 | E1 | −369.0739 (ASP) | 2.068 | Plastic | 1.544 | 56.0 | Refraction |
| 4 | QWP1 | Plano | 0.293 | | | | Refraction |
| 5 | | Plano | 1.754 | | | | Refraction |
| 6 | E2 | −110.8528 (ASP) | 3.591 | Plastic | 1.544 | 56.0 | Refraction |
| 7 | | −27.0518 (ASP) | 2.871 | | | | Refraction |
| 8 | E3 | −39.0577 (ASP) | 3.025 | Plastic | 1.544 | 56.0 | Refraction |
| 9 | BS | −62.4807 (ASP) | −3.025 | Plastic | 1.544 | 56.0 | Reflection |
| 10 | | −39.0577 (ASP) | −2.871 | | | | Refraction |
| 11 | E2 | −27.0518 (ASP) | −3.591 | Plastic | 1.544 | 56.0 | Refraction |
| 12 | | −110.8528 (ASP) | −1.754 | | | | Refraction |
| 13 | QWP1 | Plano | −0.293 | | | | Refraction |
| 14 | QWP1 | Plano | 0.293 | | | | Reflection |
| 15 | | Plano | 1.754 | | | | Refraction |
| 16 | E2 | −110.8528 (ASP) | 3.591 | Plastic | 1.544 | 56.0 | Refraction |
| 17 | | −27.0518 (ASP) | 2.871 | | | | Refraction |
| 18 | E3 | −39.0577 (ASP) | 3.025 | Plastic | 1.544 | 56.0 | Refraction |
| 19 | | −62.4807 (ASP) | 0.500 | | | | Refraction |
| 20 | QWP2 | Plano | 0.293 | | | | Refraction |
| 21 | | Plano | 0.807 | | | | Refraction |
| 22 | | Plano | 0.374 | | | | Refraction |
| 23 | IMG | Plano | 0.100 | | | | Refraction |

Note:
Reference wavelength is 587.6 nm (d-line).
The reflective polarizer RP is located between the first optical lens element E1 and the first quarter-wave plate QWP1.
The thickness of the reflective polarizer RP is included in the thickness of the first quarter-wave plate QWP1 in this table.

TABLE 4B

Aspheric Coefficients

| Surface # | 3 | 4 | 6 | 7 | 8 | 9 |
|---|---|---|---|---|---|---|
| k= | −6.21810 | — | −0.64999 | −2.51370 | −46.14521 | −91.88087 |
| A4= | 0.17998 | — | −0.20099 | −0.02191 | −4.13732 | −2.81443 |
| A6= | −0.08277 | — | −0.42485 | −0.04612 | 0.16015 | 0.26839 |
| A8= | −0.00335 | — | 0.00769 | 0.00102 | 0.03907 | −0.03789 |
| A10= | 0.00776 | — | 0.08285 | −0.00490 | 0.04812 | 0.01225 |
| A12= | 0.00732 | — | 0.01130 | 0.01595 | 0.03745 | −0.00928 |
| A14= | 0.00730 | — | −0.03305 | 0.00248 | −0.05216 | −0.00792 |
| A16= | −0.00126 | — | −0.00021 | −0.00548 | 0.00231 | 0.01326 |
| A18= | 0.00161 | — | −0.01997 | 0.00147 | 0.00487 | −0.00099 |
| A20= | −0.00245 | — | −0.02403 | −0.00012 | −0.00055 | 0.00084 |

In the 4th embodiment, the equation of the aspheric surface profiles of the aforementioned optical lens elements is the same as the equation of the 1st embodiment. Also, the definitions of these parameters shown in Table 4C below are the same as those stated in the 1st embodiment with corresponding values for the 4th embodiment, so an explanation in this regard will not be provided again.

Moreover, these parameters can be calculated from Table 4A and Table 4B as the following values and satisfy the following conditions:

TABLE 4C

Values of Conditional Expressions

| f [mm] | 19.26 | (CT1 + CT2 + CT3)/SL | 0.387 |
|---|---|---|---|
| HFOV [deg.] | 45.0 | |R5/R6| | 0.625 |
| Fno | 2.14 | |(R5 + R6)/(R5 − R6)| | 4.335 |
| V2/N2 | 36.269 | (R5 + R6)/(R5 − R6) | −4.335 |

TABLE 4C-continued

Values of Conditional Expressions

| | | | |
|---|---|---|---|
| CT1 | 2.068 | f/ImgH | 0.985 |
| CT2 | 3.591 | SL/ImgH | 1.148 |
| CT3 | 3.025 | SL/f | 1.166 |
| f/f3 | −9.600E−02 | EPD/ImgH | 0.460 |
| f/f2 | 0.297 | tan(HFOV)/f | 0.052 |
| (f2 + f3)/f1 | 0.200 | R1/R6 | 5.907 |
| T12/CT2 | 0.570 | (R1 + R2)/(R1 − R2) | −1.000 |
| (CT1 + CT2 + CT3)/(T12 + T23) | 1.766 | (R3 + R4)/(R3 − R4) | 1.646 |
| (T12 + T23)/TD | 0.362 | TD/SL | 0.606 |
| (T12 + T23)/BL | 2.357 | ER/SL | 0.301 |

5th Embodiment

Figure 5:
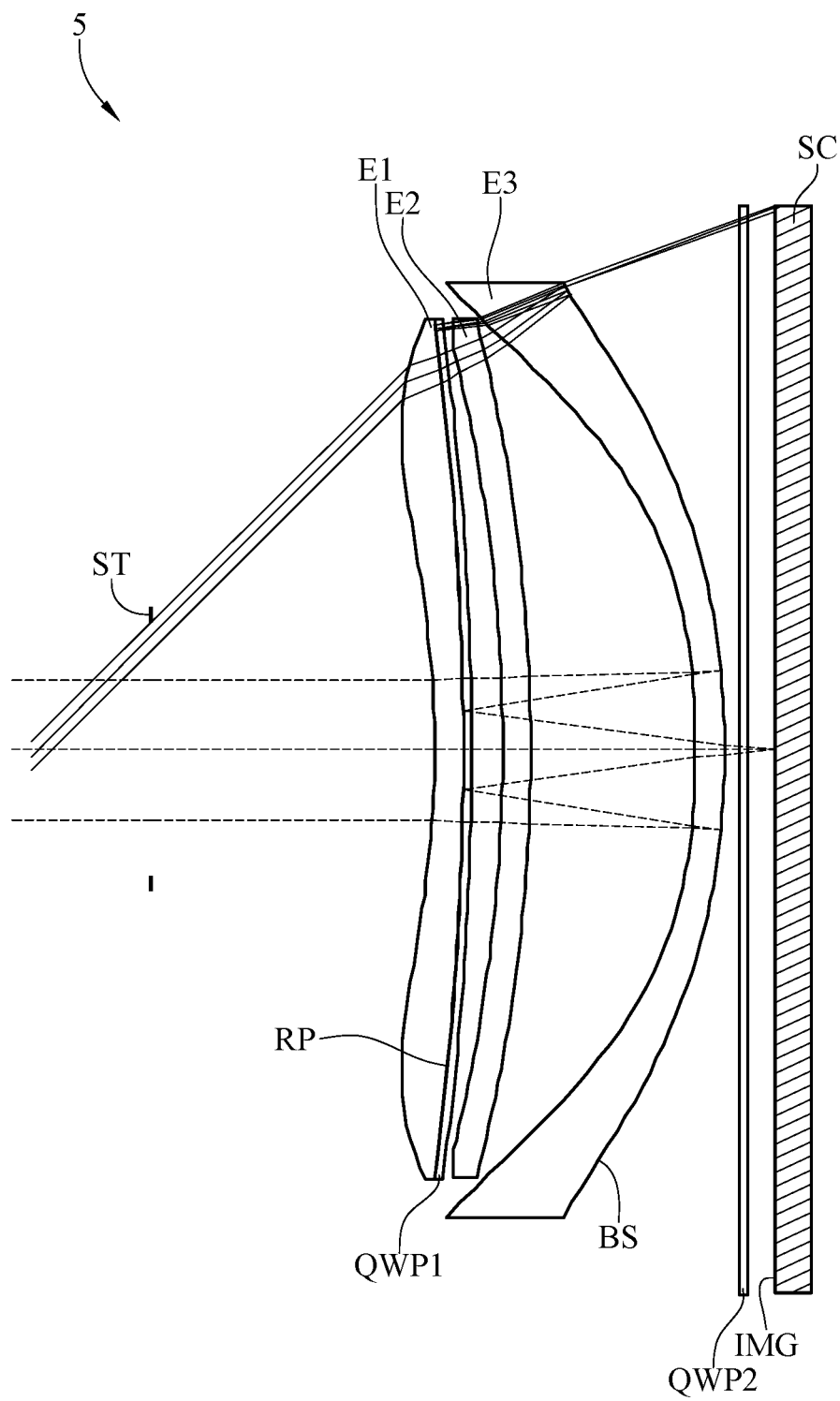
FIG. 5 is a schematic view of an optical system and a display unit according to the 5th embodiment of the present disclosure.

FIG. 5 is a schematic view of an optical system and a display unit according to the 5th embodiment of the present disclosure. The optical system 5 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 5 includes three optical lens elements (E1, E2, and E3) with no additional optical lens element disposed between each of the adjacent three optical lens elements.

The first optical lens element E1 with negative refractive power has a front-side surface being concave and a rear-side surface being convex. The first optical lens element E1 is made of plastic material and has the front-side surface being aspheric and the rear-side surface being spherical. The front-side surface of the first optical lens element E1 has at least one inflection point. The front-side surface of the first optical lens element E1 has at least one critical point.

The second optical lens element E2 with negative refractive power has a front-side surface being concave and a rear-side surface being convex. The second optical lens element E2 is made of plastic material and has the front-side surface and the rear-side surface being both spherical.

The third optical lens element E3 with negative refractive power has a front-side surface being concave and a rear-side surface being convex. The third optical lens element E3 is made of plastic material and has the front-side surface and the rear-side surface being both aspheric. The front-side surface of the third optical lens element E3 has at least one inflection point. The rear-side surface of the third optical lens element E3 has at least one inflection point.

The reflective polarizer RP is attached to the rear-side surface of the first optical lens element E1, and the first quarter-wave plate QWP1 is attached to the reflective polarizer RP.

The partial reflector BS is attached to the rear-side surface of the third optical lens element E3.

The second quarter-wave plate QWP2 is located between the partial reflector BS and the image surface IMG.

The detailed optical data of the 5th embodiment are shown in Table 5A and the aspheric surface data are shown in Table 5B below.

TABLE 5A

5th Embodiment
f = 19.00 mm, Fno = 2.11, HFOV = 45.0 deg.

| Surface # | | Curvature Radius | Thickness | Material | Index | Abbe # | Refraction/Reflection |
|---|---|---|---|---|---|---|---|
| 0 | | Plano | 1E+08 | | | | Refraction |
| 1 | | Plano | 2.500 | | | | Refraction |
| 2 | ST | Plano | 10.000 | | | | Refraction |
| 3 | E1 | −32.9019 (ASP) | 1.000 | Plastic | 1.544 | 56.0 | Refraction |
| 4 | QWP1 | −113.6798 (SPH) | 0.293 | | | | Refraction |
| 5 | | −113.6798 (SPH) | 1.000 | | | | Refraction |
| 6 | E2 | −60.7410 (SPH) | 1.021 | Plastic | 1.544 | 56.0 | Refraction |
| 7 | | −63.3644 (SPH) | 5.889 | | | | Refraction |
| 8 | E3 | −30.1486 (ASP) | 1.031 | Plastic | 1.544 | 56.0 | Refraction |
| 9 | BS | −30.5125 (ASP) | −1.031 | Plastic | 1.544 | 56.0 | Reflection |
| 10 | | −30.1486 (ASP) | −5.889 | | | | Refraction |
| 11 | E2 | −63.3644 (SPH) | −1.021 | Plastic | 1.544 | 56.0 | Refraction |
| 12 | | −60.7410 (SPH) | −1.000 | | | | Refraction |
| 13 | QWP1 | −113.6798 (SPH) | −0.293 | | | | Refraction |
| 14 | QWP1 | −113.6798 (SPH) | 0.293 | | | | Reflection |
| 15 | | −113.6798 (SPH) | 1.000 | | | | Refraction |
| 16 | E2 | −60.7410 (SPH) | 1.021 | Plastic | 1.544 | 56.0 | Refraction |
| 17 | | −63.3644 (SPH) | 5.889 | | | | Refraction |
| 18 | E3 | −30.1486 (ASP) | 1.031 | Plastic | 1.544 | 56.0 | Refraction |
| 19 | | −30.5125 (ASP) | 0.500 | | | | Refraction |
| 20 | QWP2 | Plano | 0.293 | | | | Refraction |
| 21 | | Plano | 0.807 | | | | Refraction |
| 22 | | Plano | 0.079 | | | | Refraction |
| 23 | IMG | Plano | 0.100 | | | | Refraction |

Note:
Reference wavelength is 587.6 nm (d-line).
The reflective polarizer RP is located between the first optical lens element E1 and the first quarter-wave plate QWP1.
The thickness of the reflective polarizer RP is included in the thickness of the first quarter-wave plate QWP1 in this table.

TABLE 5B

| Aspheric Coefficients | | | | | | |
|---|---|---|---|---|---|---|
| Surface # | 3 | 4 | 6 | 7 | 8 | 9 |
| k= | −54.97226 | — | — | — | 1.00000 | −7.00763 |
| A4= | 0.05442 | — | — | — | −3.37270 | −2.71420 |
| A6= | 0.44055 | — | — | — | 0.51626 | 0.40027 |
| A8= | −0.06039 | — | — | — | — | 0.00294 |
| A10= | — | — | — | — | — | 0.01593 |
| A12= | — | — | — | — | — | 0.00447 |
| A14= | — | — | — | — | — | 0.00008 |
| A16= | — | — | — | — | — | −0.00034 |

In the 5th embodiment, the equation of the aspheric surface profiles of the aforementioned optical lens elements is the same as the equation of the 1st embodiment. Also, the definitions of these parameters shown in Table 5C below are the same as those stated in the 1st embodiment with corresponding values for the 5th embodiment, so an explanation in this regard will not be provided again.

Moreover, these parameters can be calculated from Table 5A and Table 5B as the following values and satisfy the following conditions:

TABLE 5C

| Values of Conditional Expressions | | | |
|---|---|---|---|
| f [mm] | 19.00 | (CT1 + CT2 + CT3)/SL | 0.139 |
| HFOV [deg.] | 45.0 | |R5/R6| | 0.988 |
| Fno | 2.11 | |(R5 + R6)/(R5 − R6)| | 166.697 |
| V2/N2 | 36.269 | (R5 + R6)/(R5 − R6) | −166.697 |
| CT1 | 1.000 | f/ImgH | 1.004 |
| CT2 | 1.021 | SL/ImgH | 1.163 |
| CT3 | 1.031 | SL/f | 1.158 |
| f/f3 | −8.656E−06 | EPD/ImgH | 0.476 |
| f/f2 | −0.006 | tan(HFOV)/f | 0.053 |
| (f2 + f3)/f1 | 25716.941 | R1/R6 | 1.078 |
| T12/CT2 | 1.267 | (R1 + R2)/(R1 − R2) | −1.815 |
| (CT1 + CT2 + CT3)/(T12 + T23) | 0.425 | (R3 + R4)/(R3 − R4) | −47.307 |
| (T12 + T23)/TD | 0.702 | TD/SL | 0.465 |
| (T12 + T23)/BL | 4.070 | ER/SL | 0.455 |

6th Embodiment

Figure 6:
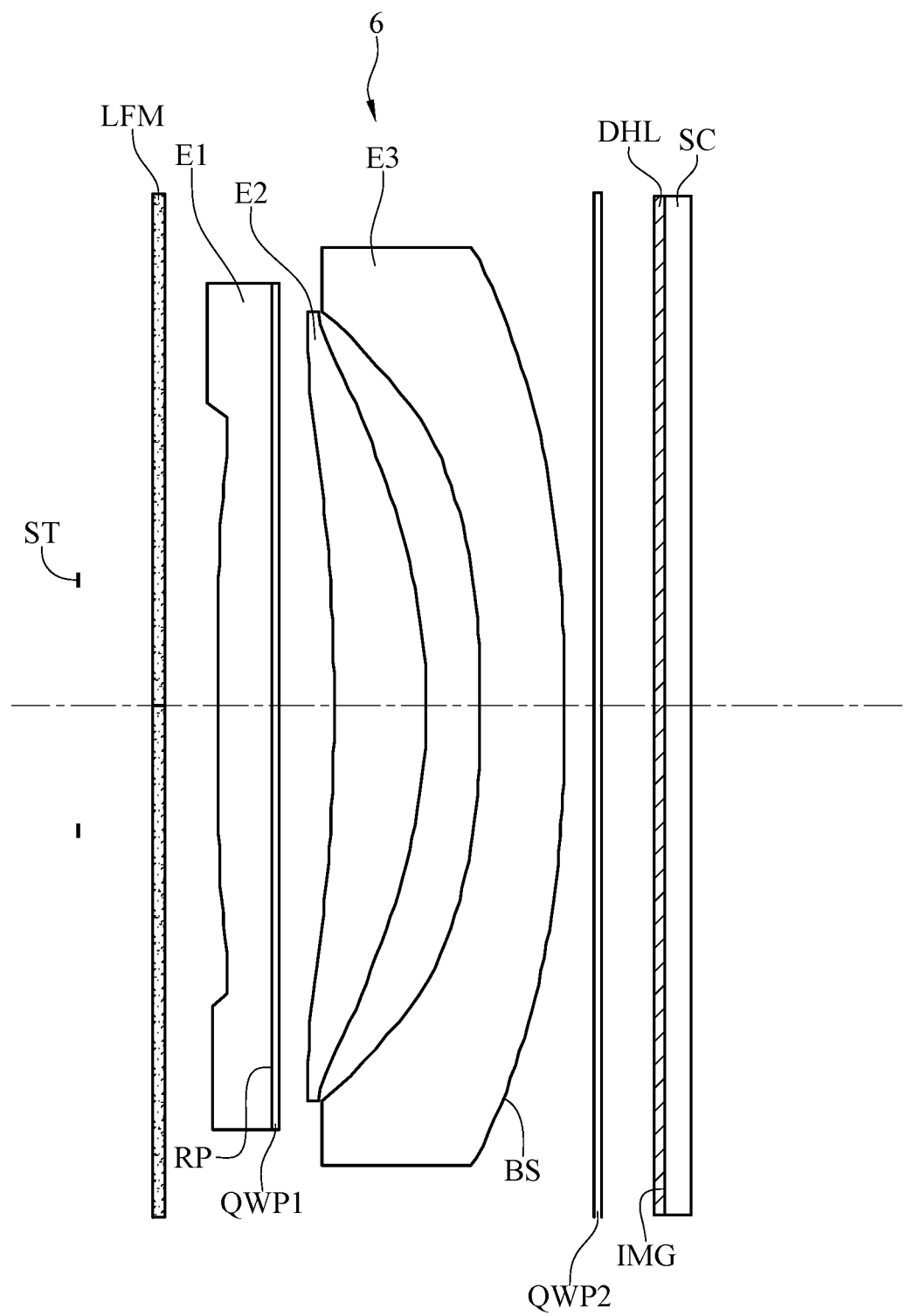
FIG. 6 is a schematic view of an optical system, a display unit, a liquid crystal focus module and a diamond like carbon film layer according to the 6th embodiment of the present disclosure.

FIG. 6 is a schematic view of an optical system, a display unit, a liquid crystal focus module and a diamond like carbon film layer according to the 6th embodiment of the present disclosure. The optical system 6 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 6 includes three optical lens elements (E1, E2, and E3) with no additional optical lens element disposed between each of the adjacent three optical lens elements. The above components of the optical system 6 in this embodiment having the same component names and reference numerals as those of the optical system 3 in the 3rd embodiment have identical or similar structural features, and the details in this regard will be omitted hereafter.

In this embodiment, a liquid crystal focus module LFM is disposed between the aperture stop ST and the first optical lens element E1, and the liquid crystal focus module LFM is configured to provide the optical system 6 with a wide adjustment range of focal length. In addition, a DLC film layer DHL is disposed on a screen of the display unit SC facing the optical system 6, and the DLC film layer DHL is configured to cool the display unit SC.

7th Embodiment

Figure 7:
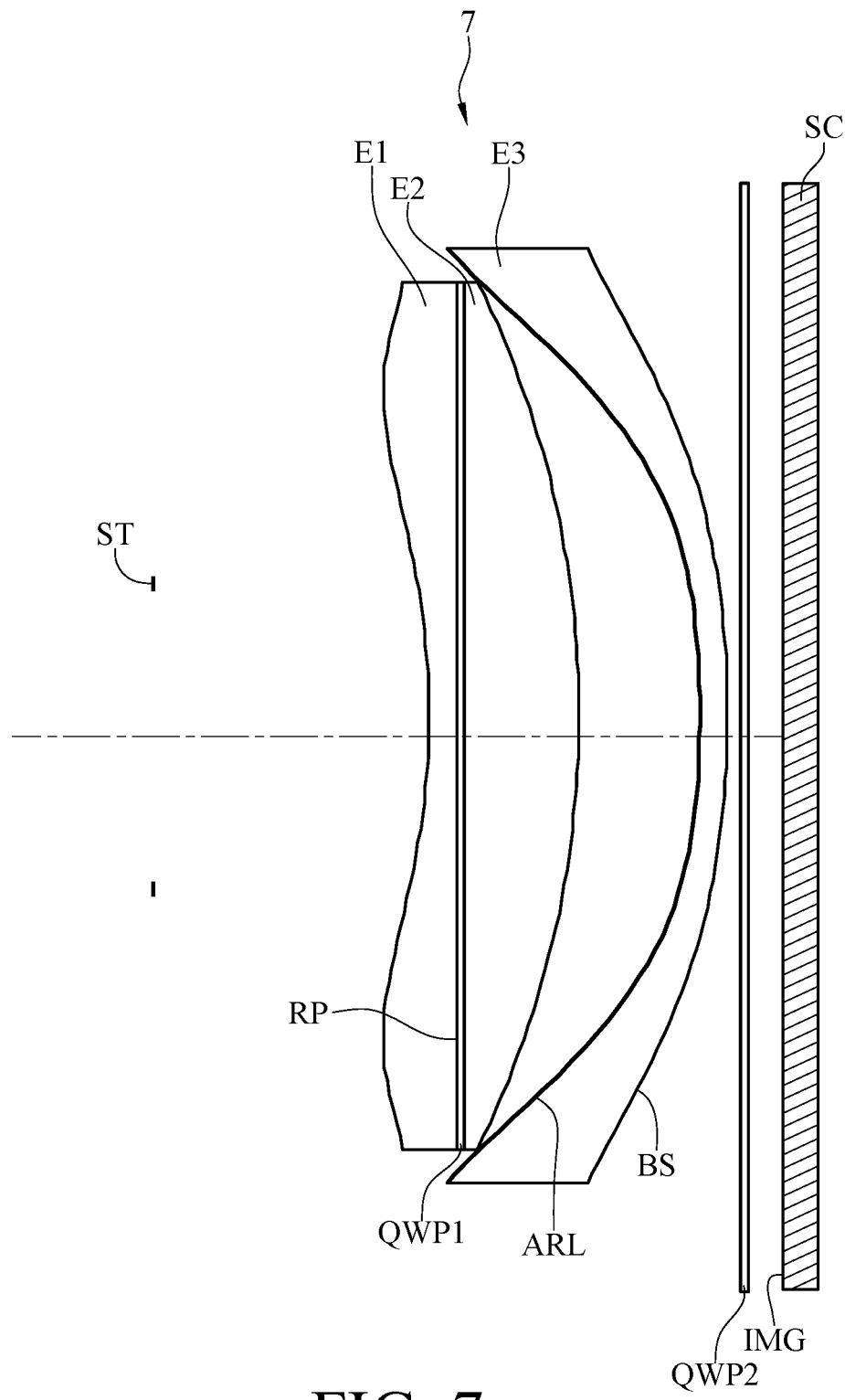
FIG. 7 is a schematic view of an optical system and a display unit according to the 7th embodiment of the present disclosure.

FIG. 7 is a schematic view of an optical system and a display unit according to the 7th embodiment of the present disclosure. The optical system 7 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 7 includes three optical lens elements (E1, E2, and E3) with no additional optical lens element disposed between each of the adjacent three optical lens elements. The above components of the optical system 7 in this embodiment having the same component names and reference numerals as those of the optical system 2 in the 2nd embodiment have identical or similar structural features, and the details in this regard will be omitted hereafter.

In this embodiment, a front-side surface of the third optical lens element E3 has an anti-reflection layer ARL, and the anti-reflection layer ARL is a subwavelength structure. The front-side surface of the third optical lens element E3 having the anti-reflection layer ARL in this embodiment is only exemplary, and the present disclosure is not limited thereto. In other embodiments, each lens surface of the optical lens elements of the optical system can have an anti-reflection layer according to actual design requirements.

8th Embodiment

Figure 8:
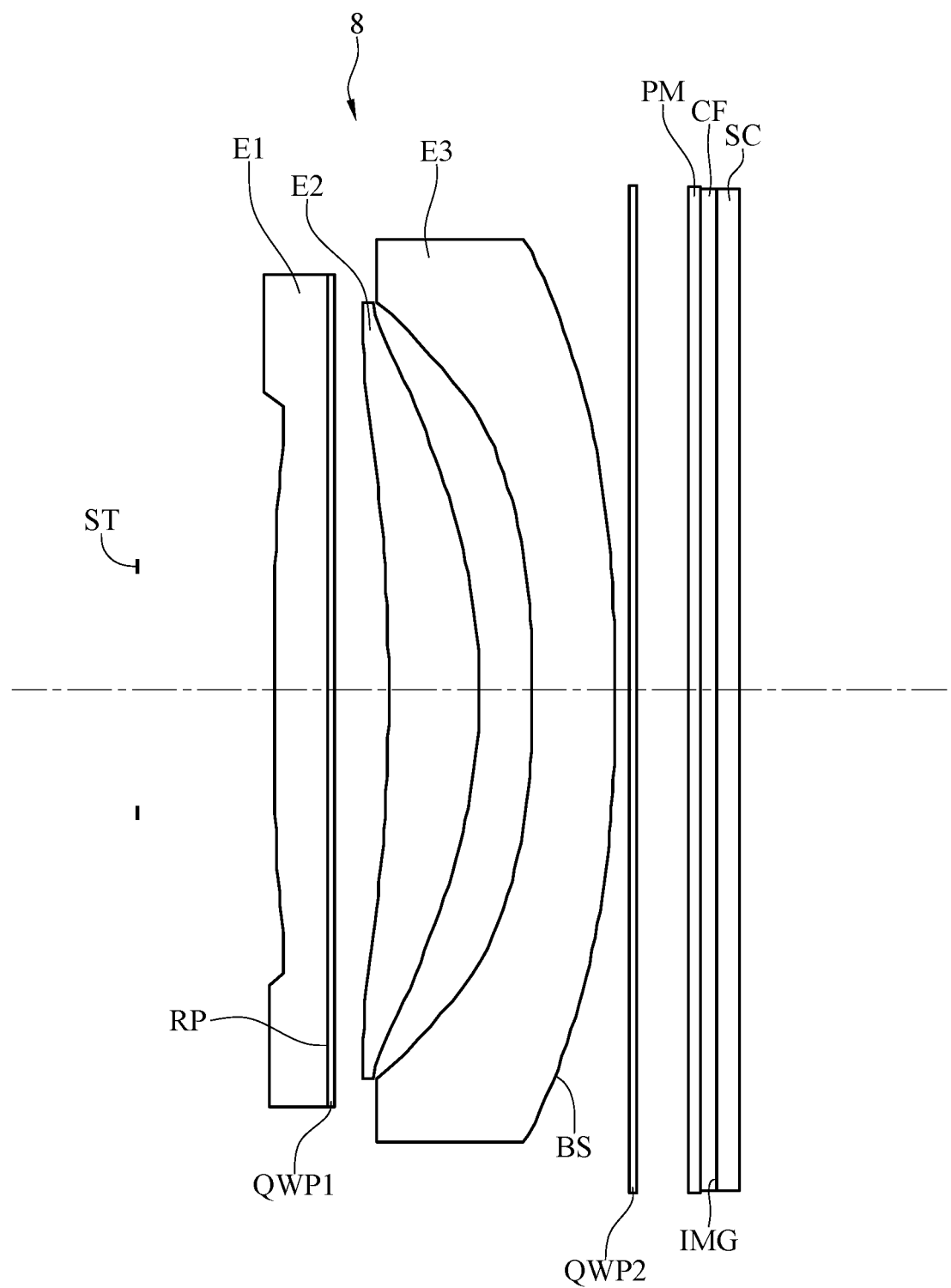
FIG. 8 is a schematic view of an optical system and a display unit according to the 8th embodiment of the present disclosure.

FIG. 8 is a schematic view of an optical system and a display unit according to the 8th embodiment of the present disclosure. The optical system 8 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 8 includes three optical lens elements (E1, E2, and E3) with no additional optical lens element disposed between each of the adjacent three optical lens elements. The above components of the optical system 8 in this embodiment having the same component names and reference numerals as those of the components of the optical system 3 in the 3rd embodiment have identical or similar structural features, and the details in this regard will be omitted hereafter.

In this embodiment, the optical system 8 further includes a polarizing element PM located between the display unit SC and the partial reflector BS. In addition, the display unit SC is an OLED panel and include a color filter CF.

9th Embodiment

Figure 9:
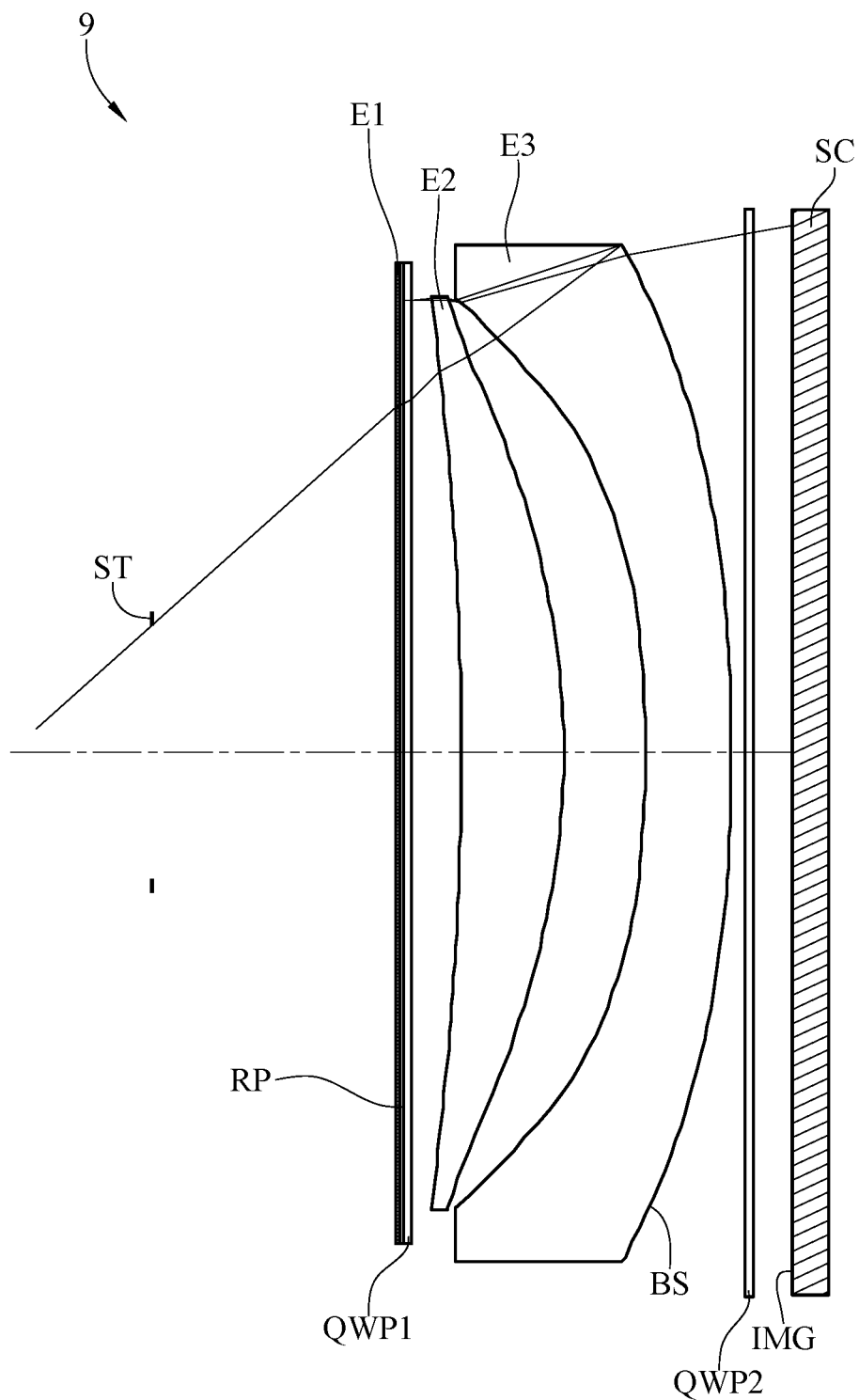
FIG. 9 is a schematic view of an optical system and a display unit according to the 9th embodiment of the present disclosure.

FIG. 9 is a schematic view of an optical system and a display unit according to the 9th embodiment of the present disclosure. The optical system 9 includes, in order from a front side to a rear side, an aperture stop ST, a first optical lens element E1, a reflective polarizer RP, a first quarter-wave plate QWP1, a second optical lens element E2, a third optical lens element E3, a partial reflector BS, a second quarter-wave plate QWP2 and an image surface IMG. The display unit SC is disposed on the image surface IMG. The optical system 9 includes three optical lens elements (E1, E2, and E3) with no additional optical lens element disposed between each of the adjacent three optical lens elements. Except for the first optical lens element E1, the above components of the optical system 9 in this embodiment having the same component names and reference numerals as those of the optical system 4 in the 4th embodiment have identical or similar structural features, and the details in this regard will be omitted hereafter.

In this embodiment, the first optical lens element E1 is a metalens element. The first optical lens element E1 being a metalens element in this embodiment is only exemplary, and the present disclosure is not limited thereto. In other embodiments, each optical lens element in the optical system can be a metalens element according to actual design requirements.

10th Embodiment

Figure 10:
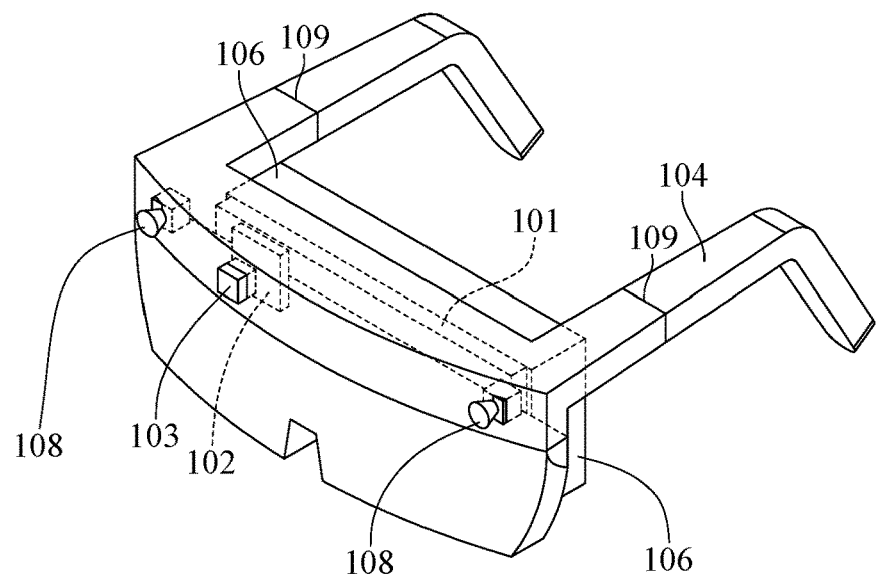
FIG. 10 is a perspective view of a head-mounted device according to the 10th embodiment of the present disclosure.
Figure 11:
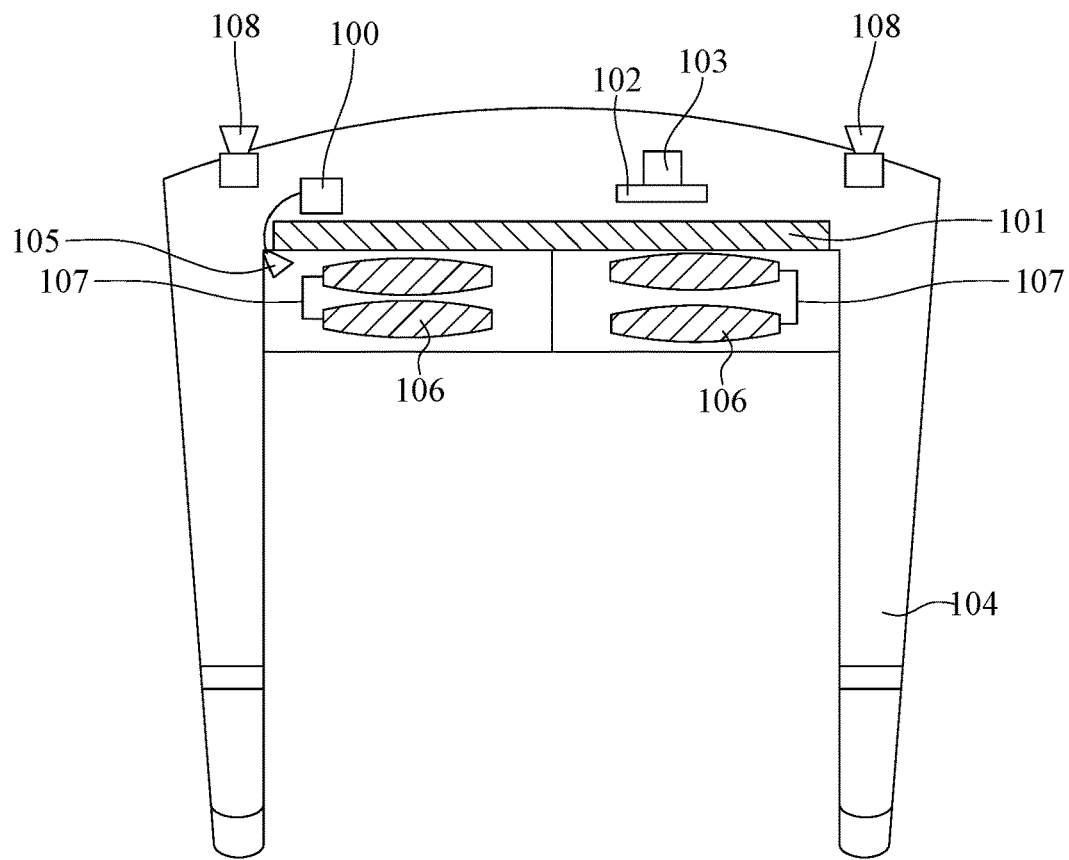
FIG. 11 is a top view of the head-mounted device in FIG. 10.

FIG. 10 is a perspective view of a head-mounted device according to the 10th embodiment of the present disclosure, and FIG. 11 is a top view of the head-mounted device in FIG. 10.

In this embodiment, the head-mounted device 10 includes a display unit 101, a digital signal processor 102, an inertial measurement unit 103, a support structure 104, an eye tracking unit 105, two optical systems 106, two auto focus units 107, two cameras 108, a compacting mechanism 109 and an iris recognition module 100. In addition, each of the optical systems 106 can be one of the optical systems of the aforementioned embodiments, and the present disclosure is not limited thereto.

The display unit 101 is configured to face the user's eyes to display an image. The inertial measurement unit 103 is configured to measure the angular velocity and acceleration of the head-mounted device 10 in the three-dimensional space so as to obtain the orientation of the head-mounted device 10. The support structure 104 may be at least one band or at least one structure similar to glasses temples for stabilizing the head-mounted device 10 on the user's head. The eye tracking unit 105 is configured to face the user's eyes so as to track the gaze position of the eyes for providing the user with data analysis of various usage scenarios and adjusting the clarity of each area of an image according to the gaze area of the eyes. The two optical systems 106 are located on one side of the display unit 101 and respectively correspond to the user's two eyes. The two auto focus units 107 are respectively disposed corresponding to the two optical systems 106, and the auto focus units 107 are configured to move the optical lens elements of the optical systems 106, so that the focal length is adjustable according to the vision of various users so as to provide the optical systems 106 with a focus function. The cameras 108 and the display unit 101 are respectively in signal communication with the digital signal processor 102, and the cameras 108 are configured to capture images of external environment for displaying on the display unit 101 via the digital signal processor 102. The images of external environment captured by the cameras 108 can be instantly displayed on the display unit 101, so that the user wearing the head-mounted device 10 is able to recognize the environment. Therefore, with the arrangement of the cameras, the captured images of external environment can be instantly displayed on the display unit, and thus, the head-mounted device can be provided with virtual reality, augmented reality and mixed reality features, and the users can view their surroundings using the real-time output function showing images of external environment without taking off the head-mounted device. Furthermore, with the arrangement of at least two cameras, the head-mounted device 10 can have various magnification ratios so as to meet the requirement of optical zoom functionality, or the head-mounted device 10 can have a recognition function by using a computer vision method. In addition, the multiple-camera configuration may include a LIDAR module, such as a structured light module or a time-of-flight module, for providing various functionalities. The compacting mechanism 109 is configured such that the dimensions of the head-mounted device 10 can be reduced (e.g., folding the head-mounted device 10) when the head-mounted device 10 is not in use. The iris recognition module 100 is in signal communication with the digital signal processor 102, and the iris recognition module 100 is configured to recognize the user's iris.

In some configurations, the head-mounted device may be provided with Bluetooth or wireless network functions so as to be in signal communication with at least one external device.

In some configurations, the head-mounted device may include at least one speaker, at least one earphone, or at least one noise-cancelling earphone so as to provide the user with sound. Moreover, in some configurations, the head-mounted device may include at least one microphone so as to receive the user's voice.

In some configurations, the head-mounted device may be paired with at least one controller, such as a game joystick, a game pad or a gaming handheld unit, so that the user is able to interact with the virtual reality, augmented reality and mixed reality functions of the head-mounted device.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:
1. An optical system comprising:
an aperture stop located at a front side of the optical system;
an image surface located at a rear side of the optical system;
a reflective polarizer located between the aperture stop and the image surface;
a partial reflector located between the reflective polarizer and the image surface;
a first quarter-wave plate located between the reflective polarizer and the partial reflector;
a second quarter-wave plate located between the partial reflector and the image surface;
a first optical lens element located between the aperture stop and the image surface;

a second optical lens element located between the first optical lens element and the image surface; and
a third optical lens element located between the second optical lens element and the image surface;
wherein the third optical lens element has negative refractive power; and
wherein an axial distance between a rear-side surface of the first optical lens element and a front-side surface of the second optical lens element is T12, an axial distance between a rear-side surface of the second optical lens element and a front-side surface of the third optical lens element is T23, an axial distance between a rear-side surface of the third optical lens element and the image surface is BL, and the following condition is satisfied:

$1.20<(T12+T23)/BL<5.20.$

2. The optical system of claim 1, wherein at least one optical lens element of the optical system has an inflection point.

3. The optical system of claim 1, wherein at least one optical lens element of the optical system has a critical point.

4. The optical system of claim 1, wherein an Abbe number of the second optical lens element is V2, a refractive index of the second optical lens element is N2, and the following condition is satisfied:

$18<V2/N2<47.$

5. The optical system of claim 1, wherein a central thickness of the first optical lens element is CT1, a central thickness of the second optical lens element is CT2, a central thickness of the third optical lens element is CT3, and the following condition is satisfied:

$CT2>CT1;$ and $CT2>CT3.$

6. The optical system of claim 1, wherein a focal length of the optical system is f, a focal length of the third optical lens element is f3, and the following condition is satisfied:

$-10<f/f3<0.$

7. The optical system of claim 1, wherein a focal length of the optical system is f, a focal length of the second optical lens element is f2, and the following condition is satisfied:

$0<f/f2.$

8. The optical system of claim 1, wherein a focal length of the first optical lens element is f1, a focal length of the second optical lens element is f2, a focal length of the third optical lens element is f3, and the following condition is satisfied:

$1.1<(f2+f3)/f1.$

9. The optical system of claim 1, wherein the axial distance between the rear-side surface of the first optical lens element and the front-side surface of the second optical lens element is T12, a central thickness of the second optical lens element is CT2, and the following condition is satisfied:

$0.55<T12/CT2<1.40.$

10. The optical system of claim 1, wherein a central thickness of the first optical lens element is CT1, a central thickness of the second optical lens element is CT2, a central thickness of the third optical lens element is CT3, the axial distance between the rear-side surface of the first optical lens element and the front-side surface of the second optical lens element is T12, the axial distance between the rear-side surface of the second optical lens element and the front-side surface of the third optical lens element is T23, and the following condition is satisfied:

$0<(CT1+CT2+CT3)/(T12+T23)<1.75.$

11. The optical system of claim 1, wherein the axial distance between the rear-side surface of the first optical lens element and the front-side surface of the second optical lens element is T12, the axial distance between the rear-side surface of the second optical lens element and the front-side surface of the third optical lens element is T23, an axial distance between a front-side surface of the first optical lens element and the rear-side surface of the third optical lens element is TD, and the following condition is satisfied:

$0.37<(T12+T23)/TD<1.$

12. The optical system of claim 1, wherein the axial distance between the rear-side surface of the first optical lens element and the front-side surface of the second optical lens element is T12, the axial distance between the rear-side surface of the second optical lens element and the front-side surface of the third optical lens element is T23, the axial distance between the rear-side surface of the third optical lens element and the image surface is BL, and the following condition is satisfied:

$1.50<(T12+T23)/BL<4.20.$

13. The optical system of claim 1, wherein a central thickness of the first optical lens element is CT1, a central thickness of the second optical lens element is CT2, a central thickness of the third optical lens element is CT3, an axial distance between the aperture stop and the image surface is SL, and the following condition is satisfied:

$0.10<(CT1+CT2+CT3)/SL<0.35.$

14. The optical system of claim 1, wherein a curvature radius of the front-side surface of the third optical lens element is R5, a curvature radius of the rear-side surface of the third optical lens element is R6, and the following condition is satisfied:

$0.01<|R5/R6|<1.$

15. The optical system of claim 1, wherein a curvature radius of the front-side surface of the third optical lens element is R5, a curvature radius of the rear-side surface of the third optical lens element is R6, and the following condition is satisfied:

$3.85<|(R5+R6)/(R5-R6)|.$

16. The optical system of claim 1, wherein a curvature radius of the front-side surface of the third optical lens element is R5, a curvature radius of the rear-side surface of the third optical lens element is R6, and the following condition is satisfied:

$(R5+R6)/(R5-R6)<0.$

17. The optical system of claim 1, wherein a focal length of the optical system is f, an image height on the image surface is ImgH, and the following condition is satisfied:

$0<f/\text{ImgH}<1.20.$

18. The optical system of claim 1, wherein an axial distance between the aperture stop and the image surface is SL, an image height on the image surface is ImgH, and the following condition is satisfied:

$0.50<SL/\text{ImgH}<1.17.$

19. The optical system of claim 1, wherein an axial distance between the aperture stop and the image surface is SL, a focal length of the optical system is f, and the following condition is satisfied:

$$1.08 < SL/f < 1.40.$$

20. The optical system of claim 1, wherein a size of the aperture stop is EPD, an image height on the image surface is ImgH, and the following condition is satisfied:

$$0.380 < EPD/\text{ImgH} < 0.476.$$

21. The optical system of claim 1, wherein half of a maximum field of view of the optical system is HFOV, a focal length of the optical system is f, and the following condition is satisfied:

$$0.05 < \tan(\text{HFOV})/f < 0.08.$$

22. The optical system of claim 1, wherein at least one optical lens element of the optical system is a metalens element.

23. A head-mounted device comprising:
a display unit;
a digital signal processor in signal communication with the display unit;
an inertial measurement unit in signal communication with the digital signal processor;
a support structure; and
the optical system of claim 1,
wherein the optical system is located on one side of the display unit, and the image surface is located at the display unit.

24. The head-mounted device of claim 23, further comprising an iris recognition module in signal communication with the digital signal processor.

25. The head-mounted device of claim 23, wherein the optical system further comprises a polarizing element located between the display unit and the partial reflector, and the display unit is an organic light emitting diode panel and comprises a color filter.

26. The head-mounted device of claim 23, further comprising a compacting mechanism.

27. The head-mounted device of claim 23, further comprising an auto focus unit disposed corresponding to the optical system.

28. The head-mounted device of claim 23, further comprising a liquid crystal focus module disposed between the aperture stop and the image surface.

29. The head-mounted device of claim 23, further comprising a camera in signal communication with the digital signal processor.

30. The head-mounted device of claim 23, further comprising an eye tracking unit.

31. The head-mounted device of claim 23, further comprising a diamond like carbon film layer.

* * * * *